(12) United States Patent
Buda et al.

(10) Patent No.: US 12,050,500 B2
(45) Date of Patent: Jul. 30, 2024

(54) OPTIMIZING MODEL ACCURACY, BATTERY POWER CONSUMED AND DATA STORAGE SPACE USED ON A PORTABLE ELECTRONIC DEVICE

(71) Applicant: KOA HEALTH DIGITAL SOLUTIONS S.L.U., Barcelona (ES)

(72) Inventors: Teodora Sandra Buda, Barcelona (ES); Johan Lantz, Barcelona (ES); Joao Guerreiro, Lisbon (PT)

(73) Assignee: KOA HEALTH DIGITAL SOLUTIONS S.L.U., Barcelona (ES)

( * ) Notice: Subject to any disclaimer, the term of this patent is extended or adjusted under 35 U.S.C. 154(b) by 100 days.

(21) Appl. No.: 17/963,128

(22) Filed: Oct. 10, 2022

(65) Prior Publication Data

US 2024/0019921 A1 Jan. 18, 2024

(30) Foreign Application Priority Data

Jul. 12, 2022 (EP) .................................... 22184520

(51) Int. Cl.
*G06F 1/3212* (2019.01)
(52) U.S. Cl.
CPC ................................ *G06F 1/3212* (2013.01)
(58) Field of Classification Search
CPC .................................................. G06F 1/3212

(Continued)

(56) References Cited

U.S. PATENT DOCUMENTS

| 7,359,713 B1 | 4/2008 | Tiwari | H04Q 7/20 |
| | | | 455/456.1 |
| 7,580,824 B1 * | 8/2009 | Lewis | G06F 30/367 |
| | | | 703/2 |

(Continued)

FOREIGN PATENT DOCUMENTS

| WO | WO2016/100816 | 12/2015 |
| WO | WO2020/205597 | 3/2020 |

OTHER PUBLICATIONS

S.H. Lee et al., "Mobile-Based Sensing Scheme to Minimize Battery Power Consumption for Urban Monitoring Systems," MDPI, Electronics 2021, 10, 198; downloaded from https://www.mdpi.com/2079-9292/10/2/198/pdf (11 pages).

(Continued)

*Primary Examiner* — Paul R. Myers
(74) *Attorney, Agent, or Firm* — MARSHALL, GERSTEIN & BORUN LLP

(57) ABSTRACT

A device running a mobile app optimizes battery power, data storage, and accuracy of a model. Data concerning a setting and modality of a sensor of the device is collected. Historical data is retrieved concerning the amounts of battery power and data storage consumed while the sensor operates in the setting. The model is trained based on the data concerning the setting and modality and on the historical data concerning the consumed battery power and data storage. The model is based on the setting of the sensor. The accuracy achieved by the model at a maximum consumed battery power and data storage is measured. The accuracy achieved by the model is compared to an accuracy threshold. The model is adopted if the accuracy of the model equals or exceeds the accuracy threshold. The device is configured to operate the sensor using the setting and the mobile app using the model.

23 Claims, 5 Drawing Sheets

(58) Field of Classification Search
USPC .......................................................... 713/320
See application file for complete search history.

(56) References Cited

U.S. PATENT DOCUMENTS

| | | | |
|---|---|---|---|
| 10,762,440 B1 | 9/2020 | Garg et al. | G06N 20/00 |
| 2010/0318828 A1* | 12/2010 | Elting | G06F 11/3062 |
| | | | 713/340 |
| 2011/0106286 A1* | 5/2011 | Lupetini | G06F 30/20 |
| | | | 700/121 |
| 2011/0213217 A1 | 9/2011 | McKenna et al. | A61B 5/00 |
| | | | 600/301 |
| 2013/0330055 A1* | 12/2013 | Zimmermann | H04N 21/4828 |
| | | | 386/240 |
| 2020/0311561 A1* | 10/2020 | Naaman | G06N 3/063 |
| 2020/0322703 A1* | 10/2020 | Bures | G06F 16/27 |
| 2021/0011741 A1* | 1/2021 | Bartfai-Walcott | H04L 9/3247 |
| 2022/0101185 A1* | 3/2022 | Asif | G06V 10/751 |
| 2022/0126864 A1* | 4/2022 | Moustafa | B60W 30/182 |
| 2022/0269835 A1* | 8/2022 | Yang | G06N 7/01 |

OTHER PUBLICATIONS

European Search Report dated Dec. 23, 2022, from the European Patent Office in the related European Application EP22184520.9.7 (7 pages).

\* cited by examiner

BATTERY USAGE OPTIMIZATION BASED ON SAMPLING CONFIGURATIONS FOR MULTIPLE SENSOR MODALITIES GIVEN A SET OF CONSTRAINTS

OPTIMIZING MODEL ACCURACY, BATTERY POWER CONSUMED AND DATA STORAGE SPACE USED ON A PORTABLE ELECTRONIC DEVICE

CROSS REFERENCE TO RELATED APPLICATION

This application is based on and hereby claims the benefit under 35 U.S.C. § 119 from European Patent Application No. EP 22184520.9, filed on Jul. 12, 2022, in the European Patent Office. This application is a continuation-in-part of European Patent Application No. EP 22184520.9, the contents of which are incorporated herein by reference.

TECHNICAL FIELD

The present invention relates to a method and system for determining sensor settings of a device to optimize the trade-offs between model accuracy, battery power consumed and data storage used.

BACKGROUND

With the advent of increasing automation and more complex applications, both in terms of data consumption and data collection, users are faced with the challenge of finding alternative solutions in order to prolong the battery life of electronic devices ranging from portable battery chargers, larger data storage devices or memories, to more advanced devices such as smartphones and the associated software solutions, such as configuring manually which apps can download data on the fly, while not connected to Wi-Fi, placing a smartphone on low-power or energy conservation mode, making use of offline mode for various apps.

With more and more "smart" solutions and apps being developed, e.g., drawing on the advantages of big data analysis, a new challenge is indirectly affecting users' devices: smart apps that use complex models, such as machine learning models, that are powered by personal data collected, e.g., by the user's smartphone.

The increasing use of such smart applications and/or models conventionally leads to a drastic increase in the amount of acquired data, thereby leading to a rapid filling of the inbuilt data storage/memory of a device and the increased sensor activity to acquire large amounts of data causing a more rapid draining of the device's battery.

The effect of the more rapid draining of the device's battery due to the increased data acquisition is further exacerbated by the need to send more data, e.g., from a mobile device to a central storage. Sending more data, e.g., from a mobile device to a central storage may not only quickly reduce the device's battery fill level, but may also use a large amount of the mobile data included in a monthly plan (especially if the mobile device sends data when it is not connected to WiFi), which is a disadvantage to a user of the device.

The present invention has the object of alleviating or even completely eliminating the problems or disadvantages of the prior art.

For example, in the case of a smartphone running a smart application employing an algorithmic model, in particular a machine learning model, the battery consumption of the device is increased because user data is acquired with a certain frequency using sensors present on the smartphone. Furthermore, the acquired data is often sent via the network to a central storage system for complex models, such as machine learning models, to be trained on this data and to provide a more personalized service back to the user.

In this case, the sampling configuration of a particular sensor (e.g., location data sampled at a coarse or fine level, and even further in the fine level, at which radius, 10 m vs 100 m) directly impacts the amount of data that the device acquires, at least temporarily stores and then sends to the central storage and processing unit.

Moreover, different sensor modalities (e.g., accelerometer data, audio data, video data, etc.) may consume varying amounts of space in a memory or data storage of the device (e.g., video data often requires more storage space than audio data) and depending on the target or requirements of the model (e.g., a specific prediction, estimation or inference accuracy) using these data, different sampling rates may be optimal for different modalities.

The amount of data (increasing or decreasing depending on the configuration level, e.g., sampling rate, as well as modality) impacts the amount of battery consumed by the device. Furthermore, the amount of data collected locally by the device and cached before being sent via the network to a central storage can impact the performance of the device and cause performance degradation, once it reaches a certain level, e.g., because sending more data requires more processing power of the device that can then not be used for other applications.

An object of the invention lies in providing a trade-off between the benefits offered by smart applications, in particular machine learning models, and the associated requirements in terms of battery consumption and/or required data storage space.

In other words, an object of the invention lies in minimizing the battery consumption and/or required data storage space of a smart application, such as an application employing a model, in particular a machine learning model, and thus increasing the battery life of a device running the smart application and increasing the data storage space of the device available, e.g., for other applications running on the device (e.g., for photos from an inbuilt camera) while ensuring that the benefits offered by the smart application are preserved, e.g., by ensuring that the accuracy of the model remains above a required level.

Finding a balance between data collection frequency and/or modality, in other words how often and what data are acquired, (and the associated requirements of battery consumption and data storage space) and the use of smart applications, such as applications employing models, in particular machine learning models, is also an object of the present invention.

SUMMARY

The present invention relates to a computer-implemented method for determining sensor settings of a device to optimize a trade-off between model accuracy, battery consumption and data storage amounts. The method involves iteratively assessing different sensor settings for the model accuracy achieved based on these settings taking into account the associated cost in terms of battery consumption and data storage space. Once a model has been identified that offers a desirable trade-off, the device is configured to operate sensors with the setting associated with the identified model.

A novel method optimizes the consumed battery power of a mobile device running configurable software, the data storage space used on the mobile device, and the accuracy of an algorithmic model used by the configurable software.

Data relating to a first setting of a sensor of the mobile device is collected. Data relating to a first modality of the sensor is collected. Historical data relating to the amount of battery power consumed while the mobile device operates in the first setting of the sensor is retrieved. Historical data relating to the amount of data storage space used while operating in the first setting of the sensor is retrieved. A first model is generated that is trained based on the collected data relating to the first setting, the collected data relating to the first modality, the retrieved historical data relating to the consumed amount of battery power and the retrieved historical data relating to the amount of data storage space used. The first model is based on the first setting of the sensor. The accuracy achieved by the first model at the maximum consumed battery power and the maximum used data storage space is measured. The first model is adopted if the accuracy of the first model both is equal to or greater than a first accuracy threshold value and is equal to or less than a second accuracy threshold. The mobile device is configured to run the configurable software using the first model and to operate the sensor using the first setting.

A system optimizes the accuracy of an algorithmic model used by configurable software running on a portable electronic device, the consumed battery power of the device, and the used data storage space on the device. For example, the portable electronic device can be a smartphone, a smartwatch or another wearable electronic device. The configurable software can be a mobile app running on a smartphone. Data relating to a first setting of a sensor of the device and data relating to a first modality of the sensor is collected. Historical data relating to an amount of battery power consumed while in the first setting of the sensor and historical data relating to an amount of data storage space used while in the first setting of the sensor is retrieved. A first model is generated that is trained based on the collected data relating to the first setting, the collected data relating to the first modality, the retrieved historical data relating to the consumed amount of battery power and the retrieved historical data relating to the used amount of data storage space. The first model is based on the first setting of the sensor. A performance criterion achieved by the first model at a maximum consumed battery power and a maximum used data storage space is measured. In one implementation, the performance criterion of the algorithmic model is the accuracy of the model in determining a parameter used by the configurable software. For example, the performance criterion is the accuracy by which the user's location is determined based on data collected by the sensor, such as GPS data, cell ID data, cell triangulation data, or WiFi localization data. The accuracy achieved by the first model is compared to an accuracy threshold value. The first model is adopted if the accuracy of the first model equals or exceeds the accuracy threshold value. The device is configured to run the mobile app using the first model and to operate the sensor using the first setting.

A plurality of models based on different settings of the sensor are iteratively generated, and the accuracy achieved by each of the plurality of models is compared to the accuracy threshold value until one of the plurality of models is identified that achieves an accuracy that equals or exceeds the accuracy threshold value. Examples of the first modality include: sensing accelerometer data, sensing audio data, sensing video data, and sensing GPS-based location data. The device has the sensor and a second sensor; the sensor operates in the first modality; and the second sensor operates in a second modality. The first model is adopted based on the amount of battery power consumed while operating the sensor using the first setting, the amount of data storage space used while operating the sensor using the first setting, and based on the first modality. The device is configured to change from operating the sensor using the first setting while running the mobile app using the first model to operating the sensor using a second setting while running the mobile app using a second model.

A device that optimizes consumed battery power, used data storage space, and accuracy of an algorithmic model includes a sensor, a battery, and a control unit. The control unit is configured to collect data relating to a first setting of the sensor and a first modality of the sensor, to retrieve historical data relating to an amount of power of the battery consumed while in the first setting of the sensor, and to retrieve historical data relating to an amount of data storage space used while in the first setting of the sensor. The device is also configured to generate a first model that is trained based on the collected data relating to the first setting, the collected data relating to the first modality, the retrieved historical data relating to the consumed amount of battery power and the retrieved historical data relating to the used amount of data storage space.

The first model is based on the first setting of the sensor. The device is configured to measure the accuracy achieved by the first model at a maximum consumed power of the battery and at a maximum used data storage space and to compare the accuracy achieved by the first model to an accuracy threshold value. If the accuracy of the first model equals or exceeds the accuracy threshold value, the device is configured to operate using the first model and using the sensor based on the first setting.

The device is configured to iteratively generate a plurality of models based on different settings of the sensor. The accuracy achieved by each of the plurality of models is compared to the accuracy threshold value until one of the plurality of models is identified that achieves an accuracy that equals or exceeds the accuracy threshold value. The device includes a second sensor that operates in a second modality. Examples of the second modality include: sensing accelerometer data, sensing audio data, sensing video data, and sensing GPS-based location data. The device is configured to switch from operating the sensor in the first modality to operating the second sensor in the second modality.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Figure 1:
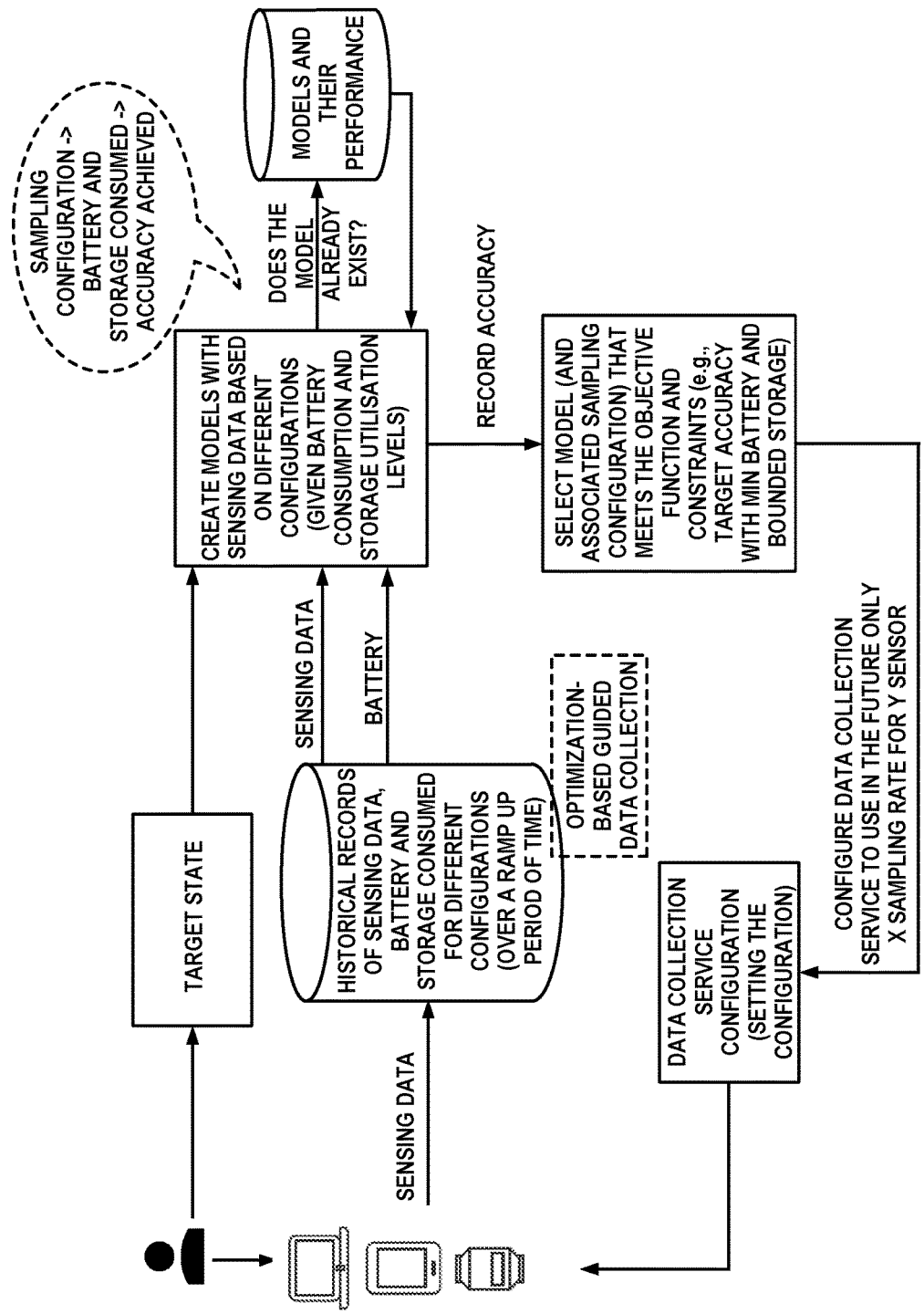
FIG. 1 illustrates an embodiment of a method according to the invention.

Reference will now be made in detail to some embodiments of the invention, examples of which are illustrated in the accompanying drawings.

A computer-implemented method for determining sensor settings of a portable electronic device optimizes the trade-off between algorithmic model accuracy, battery consumption and/or data storage space. The method involves:
 collecting data relating to a setting of at least one sensor of the device;
 collecting data relating to the modality of the at least one sensor of the device;
 retrieving from a database historical data relating to an amount of battery consumption associated with the setting of the sensor or estimating the amount of battery consumption associated with the setting of the sensor;
 retrieving from a database historical data relating to the amount of data storage space associated with the setting of the sensor or estimating the amount of data storage space associated with the setting of the sensor;
 generating at least one first model that is trained based on the collected data and retrieved historical data or estimated data and on sensory data acquired by the at least one sensor, wherein the model includes an associated first setting of the at least one sensor;
 measuring at least one performance criterion of the first model, wherein the performance criterion preferably is an accuracy achieved by the model given a fixed maximum battery consumption and/or maximum data storage consumption or is related to a battery consumption required by the model given a fixed minimum model accuracy and/or maximum data storage consumption or is related to a data storage consumption required by the model given a fixed minimum model accuracy and/or maximum battery consumption, and comparing the measured performance criterion to a threshold value;
 selecting the first model if the performance criterion of the first model lies above the threshold value or falls within a tolerance range surrounding the threshold value; and
 configuring the device to operate the at least one sensor with the first setting of the at least one sensor associated with the selected first model.

For example, in the simplest case, a device may include only one sensor, e.g., a GPS sensor. At first, data relating to a setting of the GPS-sensor is acquired; for example, the data can indicate that the GPS sensor is operated to sense GPS coordinates every 10 minutes. In addition, data relating to the modality of the sensor of the device is collected. For example, the modality may be "location data", "audio data" or "video data". The modality of the sensor preferably reflects the type of sensor.

In the next step, the amount of battery consumption associated with the setting of the sensor is determined. For example, historical data relating to an amount of battery consumption associated with the setting of the sensor can be retrieved from a database. The historical data can indicate, e.g., that operating the GPS sensor to sense GPS coordinates every 10 minutes leads to a battery consumption of 0.5% per minute. In other words, if the sensor is operated in this way, the battery fill level of the device has been found to decrease by 0.5% per minute in the past.

Alternatively or additionally, the amount of battery consumption associated with the setting of the sensor may be estimated, e.g., by using a heuristic model or by acquiring data in a ramp-up period at the beginning of or immediately preceding an interaction of the user with the device. The data acquired during the ramp-up period can preferably be regarded as historical data obtained in the same session of use of the device as the data relating to the setting of the sensor and the modality of the sensor.

For example, following up on the example with the GPS sensor described above, the user may start the smartphone or start moving with the smartphone. In the ramp-up period, e.g., the first 10 minutes, data relating to the setting of the sensor and the modality of the sensor is acquired, and also the battery consumption is monitored. For example, in the 10 minutes of the ramp-up period the battery consumption has been detected to be about 0.5% per minute. Thus, it is estimated that the battery consumption associated with the sensor setting is 0.5% per minute. Thus, if such a ramp-up period is considered, it is possible to estimate the amount of battery consumption even if a user interacts with a device and/or application and/or model for the first time (and thus it could be argued that historical data are not available), because the subportion of the time the user interacts with the device and/or application and/or model is used to generate historical data during the interaction of the user with the device and/or application and/or model.

Similarly, an amount of storage space associated with the setting of the sensor is determined. For example, historical data relating to an amount of data storage space associated with the setting of the sensor may be retrieved from a database and/or the amount of data storage space associated with the setting of the sensor can be estimated, e.g., using a heuristic method or using data acquired in a ramp-up period.

The ramp-up period can be a time period for collecting data while the user is using the app (in other words historical data can be acquired during the interaction of the user with the device). The ramp-up period can be much shorter than the time periods usually regarded as periods of historical data collection, where data regularly is collected over weeks/months.

In the next step, at least one first model is generated that is trained based on sensory data acquired by the at least one sensor that is operated according to the first setting. For example, a model is generated that predicts the location of a device/user based on data acquired by the GPS sensor, wherein the GPS sensor is operated to detect a GPS coordinate every 10 minutes with a coarse level of resolution or granularity.

The first model is preferably trained based on the collected data, e.g., the modality of the sensor (such as video, audio, GPS coordinates, etc.) and the setting of the sensor (such as sampling rate, sampling granularity, level of sensitivity, etc.), and retrieved historical data or estimated data (e.g., operating the GPS-sensor with the setting of sampling location with a coarse level of resolution every 10 minutes has led to or has been estimated to lead to a battery consumption of 0.5% per minute and to a consumption of storage space of 0.01 MB per hour), wherein the model includes an associated first setting of the at least one sensor.

The model includes an associated first setting of the at least one sensor, e.g., a setting in that the GPS-sensor is operated to detect location with a coarse level of resolution every 10 minutes.

In other words, a first model is generated and/or trained based on sensory data acquired by a sensor that is operated with a first setting. The battery consumption and storage space consumption associated with the first setting of the sensor are taken into account and linked to the first model.

Prior to the step of generating at least one first model that is trained based on the collected data and retrieved historical data or estimated data and on sensory data acquired by the sensor, wherein the model includes an associated first setting of the sensor, the method includes the step of evaluating whether such a first model already exists, preferably by interrogating a database. This step is not limited to generating the first model, but can precede any step of generating a model in the novel method.

The model can be configured to predict the location of a user or device (e.g., in a navigation device), to predict the next required maintenance of a technical device (e.g., based on detected use or movement of the device), or to predict or infer internal values of a technical device (e.g., pressure values, the level of corrosion in piping, etc.). The device may also be a control panel of a machine, and the model may be configured to predict, e.g., an overheating of an engine based on sensor data.

If audio data is sampled and thus at least one sensor of the device is a microphone, the device may be used for speech control of devices. If video data is sampled and thus at least one sensor of the device is a camera, the device may be used for gesture control of devices.

In all of these applications, it is advantageous for the model to fulfill its purpose with a minimum of associated battery consumption and a minimum of data storage space taken by the model and/or data associated therewith. Thus, preferably a sensor setting is identified that allows for a desired model accuracy, e.g., how closely do the predictions of the model match actually occurring events, with a minimum of associated battery consumption and a minimum of data storage space taken by the model and/or data associated therewith.

For example, following up on the example above, it is worth assessing whether a first setting in which the GPS sensor is operated to detect location every 10 minutes with a coarse sampling rate that causes a battery consumption of per minute and a consumption of storage space of MB per hour is actually required to ensure a desired accuracy of the model. In fact, it may be possible to achieve almost the same level of accuracy with a second setting in which the GPS sensor is operated to detect location every 20 minutes with a coarse sampling rate that causes a battery consumption of 0.25% per minute and a consumption of storage space of 0.005 MB per hour. In this case, it could prove advantageous to configure the device to operate the sensor with the second setting, because this extends battery power and leaves more free data storage space while still ensuring that the model has a desired accuracy.

In this way, the sensor settings, preferably the way each sensor is operated and which type and/or modality of sensor is used, can be optimized to select a sensor setting that achieves an advantageous trade-off between model accuracy and battery consumption and/or data storage consumption, e.g., the amount of data storage taken by the model or data associated therewith, and/or processing power consumption, e.g., the proportion of the processor used by the model or operations associated therewith, such a sending data to a central storage.

At least one performance criterion of the first model that has been generated is then measured, wherein the performance criterion preferably is an accuracy achieved by the model given a fixed maximum battery consumption and/or maximum data storage consumption or is related to a battery consumption required by the model given a fixed minimum model accuracy and/or maximum data storage consumption or is related to a data storage consumption required by the model given a fixed minimum model accuracy and/or maximum battery consumption. The measured performance criterion of the first model is then compared to a threshold value.

For example, the performance criterion of the model may be model accuracy given a maximum battery consumption of 0.6% per minute and/or a maximum consumption of storage space of 0.02 MB. The threshold value may be an accuracy of 95% in predicting the location of a device and/or user, and the tolerance range may be set to +/−1% in this example. In this example, the accuracy of the model that has been trained based on a setting in which the GPS sensor is operated to detect location every 10 minutes with a coarse sampling rate that causes a battery consumption of per minute and a consumption of storage space of MB per hour in predicting the location of the user and/or device is 95.5%. Thus, the performance criterion (in this case model accuracy) of the model has been measured to be 95.5% given the fixed maximum battery consumption of 0.6% per minute and/or a maximum consumption of storage space of 0.02 MB. In this example, the performance criterion lies above the threshold value and falls within the tolerance range.

If the performance criterion of the first model lies above the threshold value or falls within a tolerance range surrounding the threshold value, preferably the first model is selected. Thus, in the example outlined above, it has been detected that the first model meets the constraints in terms of battery consumption and data storage space consumption and still achieves an accuracy in the desired range, e.g., the predictions of the model match actually occurring events or events that actually have occurred to 95.5%. In other words, it has been detected that the sensor settings associated with the model in which a GPS sensor is operated to detect location every 10 minutes with a coarse sampling rate is suitable for achieving the desired model accuracy. Thus, in this example, the device is configured to operate a GPS sensor of the device to detect location every 10 minutes with a coarse sampling rate because this sensor setting has been determined to yield the desired model accuracy within the constraints of battery consumption and data storage space consumption. In other words, the device is configured to operate the sensor with the first setting of the sensor associated with the selected first model.

The example above captures the simplest case in which a given sensor setting, e.g., the first sensor setting, already leads to a model that can provide the desired accuracy (or other performance criterion), while the battery consumption and data storage space consumption associated with the model and the sensor setting remain within the given ranges, in particular remain below a defined maximum value.

However, it may be the case that the first model may not meet the performance criterion, e.g., because in order to achieve an accuracy above the threshold value with the sensor setting associated with the model, a battery consumption or data storage space consumption above the given maximum values of the battery consumption or data storage space consumption is required. In this case, the sensor settings can be varied, e.g., in terms of the type of sensor used (e.g., different types of cameras or microphones), in terms of sensor modality (e.g., microphones instead of cameras) and/or in terms of, e.g., sampling rate, resolution rate, granularity, etc. The term "sensor setting" or "sensor settings" preferably includes aspects of the type of sensor, the modality of sensor and/or for each sensor a sampling rate, resolution rate, granularity or other parameter relevant to the operation of an individual sensor.

A first setting in this exemplary case can include switching off the GPS sensor of the device and operating all cameras of the device to capture an image every 10 minutes. From the images, features are extracted that indicate the location where the image was captured. A first model is generated to predict the location of the user/device based on the captured images and the performance criterion, in which case model accuracy is determined to be 95.5%. However, because in this example large amounts of images are captured, the data storage consumption associated with this first setting and hence with the first model is rather high, e.g., above the given maximum data storage space consumption. Also, because of the need to perform data analysis on the pictures, the required processing power and the battery consumption are also rather high, e.g., above the respective maxima. Thus, the sensor settings are preferably adapted until a model has been generated that achieves the desired performance criterion, e.g., a desired accuracy given a maximum data storage consumption and/or maximum battery consumption.

For example, a second setting can involve switching off all cameras of the device and operating a GPS sensor to detect a GPS coordinate every 10 minutes with a coarse granularity. A second model is generated based on the second setting to predict the location of the user/device and the performance criterion, in which case model accuracy is determined to be 95.5%. With this setting, however, the data storage space consumption is lower, as no images are stored but only numerical GPS coordinates, and the battery consumption and processing power consumption are also lower because there is no need for image analysis. In this example, the battery consumption and processing power consumption associated with the second setting and thus the second model are below the maximum data storage consumption and/or maximum battery consumption. Thus, the second setting and/or the second model offer a more efficient way in terms of data storage consumption and/or battery consumption of providing a 95.5% accuracy in predicting the location of a user and/or device.

Thus, preferably, the second model is selected as the model to be used in an interaction of the device with the user because the second model offers the user the same level of accuracy while allowing for an extended battery life (due to the lower battery consumption), sufficient processing speed of the device (as less processing power is used by the model and sensor setting associated with the model) and conserving more storage space (by using less data storage space). As the second model is selected, the device is then configured to operate the sensor or sensors of the device according to the settings associated with the second model. In this example, as the second model is selected, the device is configured to switch off all cameras of the device and to operate a GPS sensor in order to detect a GPS coordinate every 10 minutes with a coarse granularity.

The step of configuring the device to operate the sensor or sensors with the setting associated with a selected model can be regarded as updating the sensor settings, including, e.g., the type of sensor used, the number of sensors activated, the modality of sensor used, and the settings of each individual sensor (e.g., on or off, sampling rate, sensitivity, granularity etc.) of the device in dependence on a measured model accuracy.

In the present example, the change from the first setting involves, e.g., changing the sensor modality (change from video data to GPS data), the number of sensors operated (e.g., change from four cameras to one GPS sensor), the type of sensor (change from cameras to GPS sensor) and the sampling rate (change from continuous stream to intermittent sampling every 10 minutes). The settings described above, however, are only non-limiting examples provided to illustrate the invention.

For example, multiple models can be generated that are each associated with a different sensor setting. Then, from the multiple models, the model is selected that has a performance criterion that most closely matches the threshold value and fulfills the constraints in terms of battery consumption and/or data storage space used. The device is then configured to operate a sensor or sensors present in the device or on external devices associated with the device (e.g., such as wearables or sensing devices arranged at a remote location) with the settings associated with the selected model.

In other words, the sensor settings are preferably iteratively adapted in order to reduce or minimize the battery consumption and/or data storage space consumption and/or processing power consumption associated with the provision of a desired model accuracy.

For example, initially a device may be configured to use an initial model for a prediction, wherein the model is configured to provide maximum accuracy without any limits regarding data storage consumption, battery consumption or processing power consumption. For example, this model may be associated with a sensor setting in which all available sensors of the device are operated with their maximum sampling rate and maximum sensitivity or resolution, e.g., a very fine granularity of 10 meters for a GPS sensor. The model accuracy of this model is above the threshold value and may lie well above the threshold value.

Based on this model, a plurality of other models may iteratively be generated that are each associated with a different sensor setting, wherein the sensor settings are preferably less demanding in terms of data storage consumption, battery consumption or processing power consumption than the settings of the initial model.

For example, in a first step, a new model can be generated that operates only half of the available sensors of the device at half their maximum sampling rate and half their maximum sensitivity or resolution, e.g., a medium granularity of 100 meters for a GPS sensor. Then, the performance criterion, e.g., the model accuracy, of the model is measured and, if the model accuracy is determined to still lie above a threshold value, the new model is selected and the device is configured to operate the sensors with the settings associated with the new model, in this case to operate only half of the available sensors of the device at half their maximum sampling rate and half their maximum sensitivity or resolution, e.g., a medium granularity of 100 meters for a GPS sensor.

The step of configuring the device to operate the sensor(s) according to the setting or settings associated with the selected model may be performed between sessions in which the user interacts with the device (e.g., between sessions in which the user opens and runs an application) and/or the device actively operates the model (e.g., between sessions in which the device draws on the model, e.g., to obtain predicted pressure values for internal processing of the device, without an interaction with the user).

For example, on a given day, a user may interact with a device based on a first model associated with a first setting.

For example, the user may open an application on the device (in particular an application using a first model) and carry the device. The location of the user is inferred or predicted at any given point in time by the first model based on data acquired with a first sensor setting.

After the user closes the application, the performance of the first model and the associated battery consumption, data storage consumption and/or processing power consumption can be evaluated, and a second model associated with a second setting that offers a sufficient accuracy associated with less battery consumption, data storage consumption and/or processing power consumption is selected. The device is then configured to operate the sensors with the second setting associated with the second model the next time the user opens the application or the next time the device uses the model. In other words, the configuration of the device relating to the sensor setting can be updated between sessions during which a user interacts with the device and/or model and/or application or during which the device employs the model and/or application.

In other words, in a first session of interaction of the user with the device, the first model may be used to, e.g., predict a location of the device, and the sensors of the device can be operated according to a first setting associated with the first model, and in a second session of interaction of the user with the device, the second model may be used to, e.g., predict a location of the device, and the sensors of the device can be operated according to a second setting associated with the first model.

The time period between the first session and the second session, which can be regarded as the time period required for updating the configuration of the sensor settings of the device, is preferably at least 10 minutes but can also extend to hours, days, months, etc., depending on how often or regularly the user or device interacts with the model, application or device.

The step of selecting a model thus preferably includes a step of selecting a setting of the sensor(s) of device, preferably a future setting of the sensor(s) of device, taking into account a model accuracy, preferably the accuracy of the selected model and/or the accuracy of a model preceding the selected model, e.g., the accuracy of a selected second model and/or the accuracy of first model. Model accuracy is only one example of a performance criterion of the model(s) that is taken into account, and other performance criteria are equally covered by this disclosure.

The values of the threshold value, the tolerance range, the maximum battery consumption, the maximum data storage consumption and/or minimum model accuracy may be set by a user or inferred by a model based, e.g., on historical data.

An objective of the present invention is to achieve an optimal configuration setting, in particular in terms of data acquisition settings or sensor settings, of a data collection service.

In one embodiment, the battery consumption of an application and/or model is optimized based on tuning or varying the sampling configuration or setting of various sensors (e.g., sampling rate), given a target accuracy of a model based on the historical collected data using that configuration and given a maximum threshold for battery utilization and/or data storage space.

In another embodiment, the accuracy achieved by a model is optimized, given a target battery and/or storage consumption level. When selecting a model, the accuracy of the model and the frequency of data collection included in a sensor setting associated with the model are taken into consideration, preferably to achieve a trade-off between the accuracy of the model and the associated frequency of data collection. For example, depending on the desired model accuracy, different sensor modalities can be sampled using different configurations, e.g., microphones or cameras can be operated to acquire sensory data more or less frequently.

When measuring the performance criterion of a model, the following aspects can be considered: battery usage, storage usage, model accuracy, sensor sampling configuration (e.g., frequency).

In one embodiment, the method can be used to reduce the energy consumption (e.g., battery consumption rate) of an application using a model, given a target accuracy of the model adopted by the application. In another embodiment, the method can be used to increase the accuracy of a model (and thus, e.g., of an application using the model), given a target and/or maximum battery and/or storage consumption level.

The method includes the step of iteratively modifying a model of a certain functionality to bring a performance criterion closer to a threshold value or tolerance range. For example, the first model and the second model may be regarded as two versions of a model for predicting and/or inferring location.

The performance criterion preferably is an accuracy achieved by the model given a fixed maximum battery consumption and/or maximum data storage consumption or is related to a battery consumption required by the model given a fixed minimum model accuracy and/or maximum data storage consumption or is related to a data storage consumption required by the model given a fixed minimum model accuracy and/or maximum battery consumption.

The performance criterion can be configured to capture a parameter of the model and/or application that is desired to be increased, such as model accuracy, wherein per se higher accuracy levels are desirable, and/or a parameter of the model and/or application that is desired to be reduced, such as a battery consumption or battery consumption rate or a data storage space consumption, wherein per se lower levels, e.g., less battery draining applications or less data storage requirements, are desirable.

Even when assessing such parameters as battery consumption and data storage space consumption that are desired to be reduced, the performance criterion may be set so that a model is selected if the performance criterion lies above a threshold value or within a tolerance range surrounding the threshold value.

For example, in a case in which the energy consumption or battery consumption (battery consumption can be regarded as energy consumption) of an application is sought to be minimized while ensuring a minimum model accuracy, the performance criterion of a model may be expressed as (100%–the battery consumption associated with a model in %).

For example, if a model is associated with a battery consumption of 20%, the performance criterion may be positively expressed as 100%–20%=80%. Thus, the numerical value of the performance criterion assessed in this way for this model is higher than the numerical value of the performance criterion of a model requiring 30% of battery consumption (100%–30%=70%). For example, given a fixed minimum model accuracy and a fixed maximum data storage space consumption, one model requires 20% of the energy available in the device and the other model requires 30% of the energy available in the device. The models have performance criteria related to the battery consumption required by the model of 80% and 70%, respectively. If, for example, the threshold value is set at 25%, in other words, a model to be selected may only use 25% of the energy available in the device, only the measured performance criterion of 80% is above the threshold value and thus the model having the performance criterion of 80% related to the battery consumption can be selected.

The term battery consumption preferably equates to the term energy consumption, however, the wording battery consumption is chosen at times to emphasize that the present invention can be used to optimize the use of limited resources, such as energy in the battery of a mobile device.

Similarly, in the case in that the data storage space consumption of an application is sought to be minimized while ensuring at least a minimum model accuracy, the performance criterion of the model may be expressed as (Total available data storage space, e.g., in MB or in % minus the data storage space consumption of a model, e.g., in MB or %).

For example, a model achieving an accuracy of 95% while using 10% of the available data storage space can have a performance criterion of 90%. A model achieving an accuracy of 95% while using 20% of the available data storage space can have a performance criterion of 80%. The performance criterion may also be expressed in, e.g., megabytes (MB). For example, the total available data storage space is 200 MB and one model achieves an accuracy of 95% while using 5 MB of the available data storage space leading to a measured value of the performance criterion of 200 MB−5 MB=195. Another model can achieve an accuracy of 95% while using only 1 MB of the available data storage space leading to a measured value of the performance criterion of 200 MB−1 MB=199. Thus, the measurement value of the performance criterion of a first model may be higher than the measurement value of the performance criterion of a second model, even if the performance criterion is used to capture a parameter or aspect to be reduced, such as data storage space consumption or battery consumption of the model.

In another example, the performance criterion of the model is the accuracy by which the model determines a parameter used by the configurable software of the mobile device. For example, the performance criterion is the accuracy by which the user's location is determined based on data collected by the sensor, such as GPS data, cell ID data, cell triangulation data, or WiFi localization data. Battery usage and data storage space are minimized to achieve an acceptable accuracy in determining the user's location. The accuracy is acceptable if it falls within an accuracy threshold value, such as within fifty meters of the actual location of the user.

Optimizing the battery usage of data collection via sensors in mobile phones is a widely studied problem, especially for energy-intensive applications such as location services. It is desirable to find a tradeoff between a frequency of data collection and the battery usage because battery draining applications can result in many users uninstalling them.

While previous methods focus on this tradeoff for particular sensors, the disclosed invention can preferably offer an integrated method by balancing the accuracy of a model such as a machine learning model with the energy and data storage space consumed by multiple different sensor modalities and/or sensor types at the same time.

For example, the novel method of the invention may not only be used to optimize or change sensor settings within a given modality or type (e.g., change the sampling rate of cameras from a continuous video stream to the intermittent acquisition of images) but can also optimize or change the type or modality of the sensor employed by a model for a given purpose. For example, the model can change from using a continuous video stream acquired by a camera for predicting location to using GPS coordinates intermittently acquired by a GPS sensor to predict location. In other words, the sensor setting associated with a first model can at least partially differ from the sensor setting associated with a second model in terms of the type of sensor(s) and/or the modality of sensor(s) included in the sensor setting.

For example, the first setting can involve operating one GPS sensor with an intermittent sampling rate of sampling a GPS coordinate every 10 minutes and one camera for capturing a continuous video stream. The second setting can involve operating one GPS sensor with an intermittent sampling rate of sampling a GPS coordinate every 10 minutes and one microphone for capturing data, e.g., every 20 minutes (based, e.g., on the reasoning that certain locations are associated with certain noises). The settings thus partially differ in the modality of sensors, wherein the first modality of sensor in this example is an optical sensor, in this case a camera and the second modality of sensor is an acoustic sensor, in this case a microphone.

Additionally or alternatively, the type of sensor can be varied, e.g., the first setting may use switching on a GPS sensor of type A and switching off a GPS sensor of type B, and the second setting may apply the opposite.

The device is preferably configured to change the operation of the sensor(s) of the device from an operation in accordance with the first setting associated with the first model to an operation in accordance with the second setting associated with the second model.

The sensor setting associated with the first model can include at least one sensor type and/or modality of sensor that is not included in the sensor setting associated with a second model. Preferably, a sensor setting includes multiple sensors, preferably of different types and/or modalities, and the amounts of data storage space and/or battery consumption associated with the sensor setting and thus with the model associated with the sensor setting take into account all sensors included in the sensor setting.

For example, the first setting can involve operating one GPS sensor with an intermittent sampling rate of sampling a GPS coordinate every 10 minutes and one camera for capturing a continuous video stream. The second setting can involve operating one GPS sensor with an intermittent sampling rate of sampling a GPS coordinate every 10 minutes and one microphone for capturing data, e.g., every 20 minutes. In this example, the first setting uses multiple sensors in two modalities, in this case the modalities of an optical sensor (camera) and a location sensor (GPS sensor). In this case, preferably, the amounts of data storage space and/or battery consumption associated with the first sensor setting and thus with the first model associated with the first sensor setting take into account all sensors included in the sensor setting. In other words, the amounts of data storage space and/or battery consumption associated with the first sensor setting preferably correspond to the summed up amounts of data storage space and/or battery consumption of all sensors of all modalities included in the first setting. In other words, the amounts of data storage space and/or battery consumption associated with the one GPS sensor with an intermittent sampling rate of sampling a GPS coordinate every 10 minutes and the amounts of data storage space and/or battery consumption associated with the one camera for capturing a continuous video stream are summed up to give the amounts of data storage space and/or battery consumption associated with the first setting.

Taking into consideration multiple types and/or modalities of sensors can offer the following advantages:

Battery consumption estimates (e.g., based on historical data) associated with a given model and/or sensor setting represent a higher percentage of the overall battery consumption of an application using the model because they include all sensor modalities. Thus, battery consumption associated with a given sensor setting is captured more accurately than in the case in which only one type and/or modality of sensor is considered.

Depending on the desired model accuracy, different sensor modalities can be sampled more or less frequently. For example, regarding an optical sensor, the sampling rate can be reduced from capturing a continuous video stream to the intermittent sampling of images. Regarding an acoustic sensor, such as a microphone, the sampling rate can be increased from capturing audio data every 30 minutes to capturing audio data every 10 minutes.

In one embodiment, the method includes the steps:

Generate a second model if the performance criterion of the first model lies below the threshold value or does not fall within the tolerance range surrounding the threshold value. The second model includes an associated second setting of the sensor, and the first and second settings of the sensor differ from each other in at least one respect or parameter (e.g., in the number of sensors used, the modality of sensors used, the type of sensors used and/or the settings of at least one individual sensor, e.g., a sampling rate, sensitivity, granularity, etc.).

Measure at least one performance criterion of the second model, and compare the measured performance criterion to the threshold value.

Select the second model if the performance criterion of the second model lies above the threshold value or falls within a tolerance range surrounding the threshold value.

Finally, configure the device to operate the sensor with the second setting of the sensor associated with the selected second model.

This embodiment can be illustrated with the examples described above.

According to another embodiment, the method can be configured to modify the sensor settings of "over-achieving" models, e.g., models that have a measured value of the performance criterion that exceeds the threshold and does not fall into the tolerance range, e.g., models having an accuracy that is far above the threshold accuracy. This is based on the reasoning that an increased level of accuracy in most cases is associated with increased levels of energy consumption and/or data storage space consumption. Thus, avoiding "excessive" model accuracy can provide a way of reducing energy consumption and/or data storage space consumption of an application using or employing a model. In other words, preferably in the step of selecting a model from a plurality of models, a deviation of the measured performance criterion of each model from the threshold value is assessed, and the selected model preferably is the model with the smallest deviation of the measured performance criterion from the threshold value.

In this way the device is preferably configured with the sensor settings associated with the model exhibiting the smallest deviation of the measured performance criterion from the threshold value. In other words, the device is preferably configured with the sensor settings required for ensuring that the performance criterion exceeds the threshold value and falls within a tolerance range, e.g., for ensuring a model accuracy of 95%+/−1%, and that also result in a minimum energy consumption and/or data storage space consumption.

In case of two models that have the same measured performance criterion, e.g., an accuracy of 95%, preferably the model is selected that is associated with less battery consumption and/or less data storage space.

In one embodiment, the novel method includes the steps:

Generate a third model if the performance criterion of the first model and/or second model lies above the threshold value and does not fall within the tolerance range surrounding the threshold value. The third model includes an associated third setting of the sensor, and the third setting differs from the first and/or second settings of the sensor in at least one parameter.

Measure at least one performance criterion of the third model and compare the measured performance criterion to the threshold value.

Select the third model if the performance criterion of the third model lies above the threshold value and falls within the tolerance range surrounding the threshold value.

Configure the device to operate the sensor with the third setting of the sensor associated with the selected third model.

The tolerance range may be set by a user or inferred or estimated based on historical data. For example, a user may set the tolerance range to correspond to a range between +/−5% of the threshold value to +/−1% of the threshold value, for example to +/−3% of the threshold value or +/−2% of the threshold value.

According to an embodiment, multiple models associated with different settings of the sensor are iteratively generated, and the measured performance criterion of each of the multiple models is compared to the threshold value until a model has been identified that has a measured performance criterion that lies above the threshold value and/or falls within a tolerance range surrounding the threshold value that is then selected. The device is then configured to operate the sensor or sensors with the settings associated with the model having the measured performance criterion that lies above the threshold value and/or falls within a tolerance range surrounding the threshold value.

In other words, a method according to the invention can include the step of iteratively generating models each associated with a different sensor setting in order to identify a model having a measured performance criterion that lies above the threshold value and/or falls within a tolerance range but requires a minimum of data storage space and/or battery consumption.

Preferably, the generated models all fulfill the same function and/or are used by the same application. In this sense, the generated models can be regarded as different versions of the same model.

For example, the application may have the purpose of indicating to a user in which operating mode a device, e.g., an engine, is to be operated. The application for this purpose employs a model for predicting the location of the device and/or engine. For example, if it is detected that the engine is present at a location at a high altitude with a low ambient pressure and high ambient temperature, the engine is to be operated in a first mode of operation. If it is detected that the engine is present at a location at a low altitude with a high ambient pressure and low ambient temperature, the engine is to be operated in a second mode of operation. Thus, the model is used to predict or detect the location of the device and/or engine. The model may use different sets of sensory data corresponding to different sensor settings to predict or detect the location of the device and/or engine. For example, the model may predict or detect the location of the device and/or engine based on data acquired by a GPS sensor. Alternatively, the model may predict or detect the location of the device and/or engine based on data acquired by a temperature sensor and a pressure sensor, e.g., a barometer. In other words, the model for predicting or detecting the location of the device and/or engine may be a first model associated with a first sensor setting based on a GPS sensor, or the model for predicting or detecting the location of the device and/or engine may be a second model associated with a second sensor setting based on a temperature sensor and a pressure sensor.

The novel method can include the step of iteratively modifying a model (e.g., a model for a given purpose), in particular by modifying a sensor setting or sensor settings associated with the model, to improve the performance criterion of the model (e.g., achieve a better model accuracy with the same battery consumption and/or data storage space consumption) until the performance criterion of the model exceeds a threshold value and/or falls within a tolerance range surrounding the threshold value. The device is configured to operate the sensor(s) of the device according to the sensor setting or sensor settings associated with the model and/or version of the model that has the performance criterion that exceeds a threshold value and/or falls within a tolerance range surrounding the threshold value.

According to an embodiment of the invention, each model, e.g., the first model, second model and third model, is associated with multiple settings, each relating to a sensor of a plurality of sensors. The settings can relate to sensors of different modalities. The setting associated with a model can include multiple settings, each relating to an individual sensor and or a group of sensors, such as a type or modality of sensor.

For example, the first model can be associated with the following setting for a GPS sensor: switched on, detect a GPS coordinate every 10 minutes with a coarse level of resolution; the following setting for the cameras of the device: switched off, and the following setting for the microphones of the device: switched off. In this case, the setting associated with the first mode includes settings relating to a GPS sensor, cameras and microphones, respectively.

The plurality of sensors includes at least two types of sensors relating to different modalities. The sensory modalities can relate to sensors for capturing audio data (e.g., microphones), sensors for capturing visual data (e.g., cameras for capturing videos or images), sensors for capturing haptic data (e.g., pressure sensors or temperature sensors), and sensors for capturing proprioceptive data such as movement data, acceleration data, etc. The sensory modalities of the sensors are not restricted to sensory modalities accessible to human beings and thus also include location data, e.g., GPS sensors, and sensors for sensing parameters of the environment, such as sensors for measuring ambient pressure, etc. The sensory modality of a sensor can indicate the type of data a sensor acquires, e.g., audio data or location data.

The type of sensor can relate to a particular structural implementation of a sensor of a given modality. For example, the sensory modality of visual data can involve cameras of different types, e.g., different configurations. Similarly, in terms of the sensory modality of audio data, different types of sensors, e.g., microphones of different structural configurations, can be used. Thus, the step of selecting a model and thus an associated sensor setting and then configuring the device to operate the sensor(s) with the selected setting(s) includes changing the modality of sensors (e.g., GPS sensors instead of cameras are used to detect location) used and/or changing the type of sensors used (e.g., different cameras are used to acquired images).

In one embodiment, in the step of selecting a model, the modalities of the sensors to which the settings associated with each model pertain are taken into account (e.g., it is taken into account whether the settings associated with a model pertain to cameras or GPS sensors, etc.) and the battery consumption and/or data storage requirements of each type of sensor are taken into account (e.g., operating cameras to capture images or videos requires more data storage space and battery consumption than does operating a GPS sensor). Thus, preferably, the selection of a model is based on a combined assessment of data storage consumption and battery consumption of all sensors of all modalities involved in the setting and/or settings associated with a model.

The selection of the model is preferably performed based on a common or combined data storage consumption and battery consumption calculated as the summed-up data storage consumption and/or battery consumption of all settings of all sensors of all modalities associated with the model or models. For example, in order to assess the combined data storage consumption and battery consumption associated with a sensor setting associated with a model, the storage consumption and/or battery consumption of the GPS sensor operated according to the setting and the storage consumption and/or battery consumption of the cameras operated according to the setting are added up. Thus, by taking into account all types of sensors and/or modalities of sensors included in a sensor setting associated with a model, the amounts of data storage consumption and/or battery consumption associated with a model can be assessed with an improved accuracy. Thus, the step of selecting a model is improved.

In another embodiment, the device includes at least two types of sensors, preferably relating to different modalities, and the device is configured to change the operation of the at least two types of sensors based on the setting or settings associated with the selected model.

For example, a first model can be associated with a setting in which only a camera is operated to acquire or collect data. A second model can be associated with a setting in which only a microphone is operated to acquire or collect data. In the case in which the second model is selected, the device is configured to change the operation of the two types and modalities of sensors by switching off the camera (optical sensor) and switching on the microphone (acoustic sensor).

In one embodiment, the device is configured to at least partially switch from a mode of data acquisition using a first type or modality of sensor to a mode of data acquisition using a second type or modality of sensor based on the setting or settings associated with the selected model.

Another aspect of the invention relates to a device, wherein the device is preferably adapted to perform a method according to the present invention. An embodiment thus relates to a device configured to determine sensor settings of the device so as to optimize the trade-off between model accuracy, battery consumption and data storage amounts. A control unit of the device is configured to perform the steps:

Collect data relating to a setting of at least one sensor of the device, for example by accessing a memory of the device.

Operate the at least one sensor of the device according to the setting of the at least one sensor to acquire data, preferably sensory data.

Collect data relating to the modality of the at least one sensor of the device, for example by accessing a memory of the device.

Retrieve from a database, that can be external to the device, historical data relating to an amount of battery consumption associated with the setting of the sensor or estimate the amount of battery consumption associated with the setting of the sensor.

Retrieve from a database that can be external to the device, historical data relating to an amount of data storage space associated with the setting of the sensor or an estimate of the amount of data storage space associated with the setting of the sensor.

Generate at least one first model that is trained based on the collected data and retrieved historical data, and preferably on data acquired by the at least one sensor operated according to the setting the collected data pertain to, wherein the model includes an associated first setting of the at least one sensor, for example wherein the first setting of the at least one sensor corresponds to the setting of the sensor to which the collected data pertains and/or a setting of the sensor used to acquire data on which the first model is trained;

Measure, preferably by means of an evaluation unit, at least one performance criterion of the first model, wherein the performance criterion preferably is an accuracy achieved by the model given a fixed maximum battery consumption and/or maximum data storage consumption or is related to a battery consumption required by the model given a fixed minimum model accuracy and/or maximum data storage consumption or is related to a data storage consumption required by the model given a fixed minimum model accuracy and/or maximum battery consumption, and compare the measured performance criterion to a threshold value.

Select the first model if the performance criterion of the first model lies above the threshold value or falls within a tolerance range surrounding the threshold value.

Configure the device to operate the at least one sensor with the first setting of the at least one sensor associated with the selected first model.

In the case in which the first model is selected, the operation of the sensors of the device cannot change because the first setting of the at least one sensor (e.g., operating a GPS sensor to detect a GPS coordinate with a coarse resolution every 10 minutes) already allows for the generation of a model having a performance criterion above the threshold value, e.g., a desired model accuracy (e.g., prediction accuracy) while keeping battery consumption and/or data storage space consumption within desired limits.

In other words, initially the device can collect data relating to a sensor setting, e.g., the sensor setting is operating a GPS sensor to detect a GPS coordinate with a coarse resolution every 10 minutes. The sensor setting to which the collected data pertains can be regarded as the first setting of the sensor. In other words, the device can initially detect with which setting at least one sensor (or multiple sensors) of the device is currently operated. The device can operate the at least one sensor (in this example the GPS sensor) to acquire data, preferably sensory data, according to the detected setting, i.e., in this example to obtain a series of GPS coordinates operating the GPS sensor to detect a GPS coordinate with a coarse resolution every 10 minutes. In other words, the device can subsequently or simultaneously acquire sensory data (e.g., GPS coordinates) by operating the sensor according to the detected setting.

In this example, historical data are retrieved from a database which indicate the amount of data storage space consumption and/or battery (or energy) consumption associated with the detected sensor setting. For example, in the past, operating the GPS sensor to detect a GPS coordinate with a coarse resolution every 10 minutes was associated with a data storage space of 0.01 MB per hour and a battery consumption rate of −0.5% per hour.

A model, in particular a machine learning model, can then be trained based on the sensory data acquired by operating the sensor according to the detected setting, in this case the series of GPS coordinates obtained by operating the GPS sensor to detect a GPS coordinate with a coarse resolution every 10 minutes.

The collected data and/or historical data or estimated data pertaining to the amount of data storage space consumption and/or battery (or energy) consumption associated with the detected sensor setting are preferably also taken into account when training the model, such that the trained model provides a link between a model accuracy (e.g., the accuracy with which events predicted by the model match events that actually occur), a sensor setting used to acquire sensory data for training the model and/or for entering into the model to perform a prediction (e.g., in this example a sensor setting of operating the GPS sensor to detect a GPS coordinate with a coarse resolution every 10 minutes), and the amounts of battery consumption and/or data storage space associated with the sensor setting (e.g., in this example a sensor setting of operating the GPS sensor to detect a GPS coordinate with a coarse resolution every 10 minutes) that have been determined based on historical data pertaining to the device and/or that have been estimated, e.g., using a heuristic function.

The trained model at least includes information relating to the sensor setting used to acquire sensory data for training the model and/or for entering into the model to perform a prediction. In this example, the model (the first model) is associated with the sensor setting of operating the GPS sensor to detect a GPS coordinate with a coarse resolution every 10 minutes. The sensor setting of operating the GPS sensor to detect a GPS coordinate with a coarse resolution every 10 minutes corresponds to the first sensor setting associated with the first model. In other words, the first model includes an associated first setting of the at least one sensor (in this example a GPS sensor).

Measuring the model accuracy of the first model thus can offer a way of measuring the model accuracy achievable with a given sensor setting, i.e., with the first setting, at a certain cost in terms of data storage space consumption and/or battery consumption. Conversely the sensor settings can be optimized to achieve a desired model accuracy at a certain cost in terms of data storage space consumption and/or battery consumption. In this regard, the novel method and device disclosed herein determine or detect or identify sensor settings that optimize the trade-off between model accuracy, battery consumption and/or data storage amounts. In other words, a sensor setting (comprising or relating to one or more sensors) can be identified that leads to a model drawing on sensory data acquired with the sensory setting having a performance criterion that exceeds a threshold value and/or falls within a tolerance range surrounding the threshold value.

Different sensor settings can be considered and evaluated in terms of the performance criterion (e.g., model accuracy) of a model associated with each sensor setting (e.g., a first model having a first sensor setting and a first measured value of the performance criterion; a second mode having a second sensor setting and a second measured value of the performance criterion) and then that model is selected that has a performance criterion that matches the threshold value most closely. The device is then configured to operate the sensor(s) of the device in the future with the sensor setting associated with the selected model.

For example, if the accuracy of the first model is found to be below the threshold value, then a second model can be generated that is associated with a second sensor setting that is at least partially different from the first sensor setting associated with the first model. If the accuracy of the second model is found to be above the threshold value and/or within the tolerance range surrounding the threshold value, then the second model is selected. The configuration of the device is then updated so that in the future the device operates the sensor(s) of the device according to the second setting associated with the second model. In addition, an application (e.g., an application used to infer or predict location) running on the device is preferably updated to use the second model in the future.

The step of generating a model and comparing the performance criterion can be repeated or iterated until a model has been generated that has a performance criterion that exceeds the threshold value and/or falls within the tolerance range surrounding the threshold value, where the performance criterion preferably matches the threshold value. In other words, the sensor settings can be optimized to achieve a desired performance criterion of a model, e.g., to achieve a desired model accuracy while meeting constraints in terms of energy consumption and/or data storage space consumption. The sensor setting(s) of the device and the model employed by the device, e.g., by an application running on the device, can thus be iteratively improved or adapted, until the performance criterion of the model exceeds a desired threshold.

In another embodiment, the control unit of the device is configured to perform the steps:

Generate a second model if the performance criterion of the first model lies below the threshold value or does not fall within the tolerance range surrounding the threshold value. The second model includes an associated second setting of the at least one sensor and the first and second settings of the at least one sensor differ from each other in at least one parameter.

Measure at least one performance criterion of the second model and compare the measured performance criterion to a threshold value.

Select the second model if the performance criterion of the second model lies above the threshold value or falls within a tolerance range surrounding the threshold value.

Configure the device to operate the at least one sensor with the second setting of the at least one sensor associated with the selected second model.

Alternatively or additionally, the control unit of the device can be configured to perform the steps:

Generate a third model if the performance criterion of the first model or second model lies above the threshold value and does not fall within the tolerance range surrounding the threshold value (e.g., if the first model or the second model is an "overachieving" model in terms of model accuracy). The third model includes an associated third setting of the at least one sensor, and the third setting differs from the first and/or second settings of the at least one sensor in at least one parameter.

Measure at least one performance criterion of the third model and compare the measured performance criterion to the threshold value.

Select the third model if the performance criterion of the third model lies above the threshold value and falls within the tolerance range surrounding the threshold value.

Configure the device to operate the at least one sensor with the third setting of the at least one sensor associated with the selected third model.

The step of generating a model can be performed by the control unit of the device and/or by a processing unit remote or separate from the device. For example, the step of generating a model can be performed by a central controller that electronically communicates with the device.

According to an embodiment, the control unit of the device is configured to iteratively generate multiple models associated with different settings of the at least one sensor and to compare the measured performance criterion of each of the multiple models to the threshold value, for example, by means of a comparison unit or an evaluation unit, until a model has been identified that has a measured performance criterion that lies above the threshold value and/or falls within a tolerance range surrounding the threshold value.

The control unit of the device can be configured to generate multiple models and preferably at least temporarily store the multiple models in a memory. Each model is preferably associated with multiple settings, each relating to a sensor or a plurality of sensors. Preferably, the setting(s) associated with each model are at least partially different from the setting(s) associated with the other models.

The novel device includes at least two types of sensors relating to different modalities. In other words, the device includes and/or is operatively connected to (e.g., if sensors are present on an external or separate device) at least two types and/or modalities of sensors.

In the step of selecting a model, the control unit can be configured to take into account the modalities of the sensors to which the settings associated with each model pertain and to take into account the battery consumption and/or data storage requirements of each type of sensor. Additionally or alternatively, in the step of selecting a model a summed up battery consumption and/or data storage space consumption of all sensors, preferably all types of sensors and/or modalities of sensors comprised in the setting associated with the selected model are taken into account.

For example, a model is not selected if it achieves a given accuracy with a reduced activity or sampling rate of GPS sensors, if any reductions in battery consumption and/or data storage space consumption resulting therefrom are rendered moot by an increased operation of cameras acquiring videos. The sum of the battery consumption and/or data storage space consumption of the GPS sensors and the cameras can in fact be rather high, and thus the performance criterion of the model (e.g., model accuracy for a given maximum battery consumption and/or data storage consumption) may not exceed the threshold (e.g., because the battery consumption and/or data storage consumption). Thus, by using an integrated approach in which the common, combined or summed-up battery consumption and/or data storage consumption of all sensors, e. g. sensors of different types and/or modalities, included in the setting associated with a model is taken into account enables a better selection of the model.

In one embodiment, the device includes at least two types of sensors of different modalities, and the control unit is configured to change the operation of the at least two types of sensors based on the setting or settings associated with the selected model. The control unit is configured to operate the device to at least partially switch from a mode of data acquisition using a first type of sensor, that is, e.g., associated with a first model, to a mode of data acquisition, that is, e.g., associated with a second model, using a second type of sensor based on the setting or settings associated with the selected model (e.g., the second model).

A further aspect of the invention relates to a computer program product, comprising instructions which, when the program is executed by a device, cause the device to perform a method according to an embodiment of the present invention.

An embodiment of a method according to the invention that is illustrated in FIG. 1 comprises the following steps:

FIG. 1 illustrates the steps of a novel method for determining sensor settings of a portable electronic device by optimizing the trade-off between battery consumption, data storage space, and algorithmic model accuracy.

A first step involves data collection or ingestion and preprocessing. This step includes collecting historical records where the user's data collection application (that preferably employs a model, e.g., a machine leaning model) uses different configurations for data sampling for different sensor modalities (e.g., different sensor settings) over a period of time. At the same time in this step, the device records the battery power and the storage space consumed by the data collection application. The method generates suggested sampling rates (or more generally sensor setting(s)) that are more likely to achieve the target function. The target function is to achieve a model accuracy that renders the application objectively or subjectively acceptable to the user.

In a next step, an algorithmic model is generated or selected. In this step, preferably multiple models (e.g., machine learning (ML) models) are created based on the historical data. Each model is trained based on a particular sensor setting or settings, e.g., different sampling configurations for different sensors. For each model, the accuracy level achieved by the model is recorded.

In a next step, the sampling configuration is selected.

Based on the previous steps and the target function, an optimal configuration is selected that meets the objective function and constraints. Examples of constraints are the maximum desired accuracy level or the minimal allowable battery/storage consumption. An example of an optimal configuration is one that achieves an accuracy of 95% with a maximum data storage space consumption of 1 MB and a maximum battery consumption of 20%.

In a next step, the data collection parameters of the device are configured. The data collection service is configured with the different sampling configurations determined in the previous step. Preferably, the device is configured with the sensor settings corresponding to the model of the plurality of models that best fulfills the target function.

The method steps illustrated in FIG. 1 are further described in more detail below.

In the data collection and preprocessing step, historical records of sensing data, e.g., sensory data acquired by a sensor) are ingested (e.g., collected or retrieved) and converted into features. For example, features may be extracted from the historical data. The features can be shapes extracted from images by automated image analysis or episodes in which human speech is recorded that are extracted from acoustic data acquired by a microphone. Structured data is preprocessed, for instance on a weekly basis, to build aggregated features.

Other types of sensor modalities (e.g., voice, video) are transformed into relevant features, either as embeddings or structured features, such as a number of negative/positive words uttered in a given time period, repetitive vocalizations, prosodic voice features such as pitch, loudness or timbre, etc. The sensor modalities are then aggregated on a similar basis, e.g., daily, monthly, weekly, etc., as the other features. Coupled with these historical records is the information on battery consumption over each time period (e.g., daily/weekly battery consumption for a device such as a handset, and/or data collection service only), as well as storage consumed by the data collection service (that can correspond to an application running on a device) over the time period.

On devices/platforms that do not allow measuring battery consumption on an individual application level, the device is restricted to using only the data collection application for gathering the battery consumption information over a ramp-up period of time in order to determine the closest estimate to the application consumption level. Moreover, most of the time the user is not interacting with the device, so focusing on the values collected in the background while using the different configurations provides a very good estimation over time regardless of any restrictions imposed by the platform.

A "configuration" is generated that details which sampling configurations (e.g., sampling rate or data acquisition rate) are used for which sensor in a data collection app. A configuration is defined as: $\vec{SC}=(sc_1, \ldots, sc_k)$, where k equals the number of configurable sensors of the device, and $\vec{SC}$ denotes the configuration or setting, e.g., a set of the sampling configuration for each sensor.

In one implementation, the data collection can be performed during a ramp-up period during which the user is instructed to use only the data collection service and/or application on the user's device, e.g., smartphone, in order to obtain an accurate estimate of the battery consumption for the application.

In the step of generating or selecting the algorithmic model, the preprocessed historical sensing data is operated on by the model (one model per configuration or sensor setting). Possible algorithmic models include but are not limited to machine learning models. Such models include but are not limited to: a recommendation system for entertainment, for advertisements, or for health activities; a prediction model that assesses a user's state or a device's internal state; a location-based path configuration; and a model for predicting required maintenance of a device.

If a model has already been created based on data collected with the same sampling configurations for the sensors and for the same purpose (e.g., prediction of a location), its performance is retrieved from a database. In other words, the step of generating a model can involve selecting and retrieving the model from a database. The step of generating a model can also involve generating a model de novo or generating the model by modifying an existing model.

If no such model has already been created, the method proceeds to create the model based on the historical data that matches the configuration, e.g., sensor setting. The accuracy level achieved by the model is recorded for each different sampling configuration or sensor setting available from the historical data, as well as the battery power consumed by the collection or application employing the model at that time, and the memory storage consumed by the data collection service or application employing the model at that time.

In one embodiment, the step of configuring the data collection and sampling parameters of the device uses an optimization algorithm. Given the different parameters generated in the previous step (e.g., accuracy level, sampling configuration or sensor setting(s), battery consumption, storage utilization, etc.), an optimization algorithm selects the sampling configurations and sensor setting(s). In other words, the optimization algorithm selects a model associated with the selected sensor setting(s). The step of generating or selecting a model can thus be performed by a selection unit of the device that applies an optimization algorithm. Depending on the use case (e.g., medical, personalization, etc.), the method chooses between several options when selecting a model.

Given a target accuracy level, the method chooses a configuration for the sensor collection app that minimizes the battery consumption or storage space consumption as follows:

a) $\vec{SC}=(sc_1, \ldots, sc_k)$, such that $\vec{SC}=\text{argmin XConsumptionRate}(sc_1, \ldots sc_2, \ldots, sc_k)$
subject to the constraint
$\text{YConsumptionRate}(sc_1, sc_2, \ldots, sc_k) \leq \text{maxYConsumptionRate}$
that achieves the target accuracy level for the model created on data collected at these sampling configurations, where $(X, Y)=\{(\text{Battery,Storage}), (\text{Storage, Battery})\}$, such that X is either battery or storage consumption level, and Y is the storage or battery consumption level, respectively. In other words, the selection of the model can be performed according to the formula given above. The setting(s) of the sensor(s) of the device can thus be selected based on the formula given above.

Given a maximum battery consumption level, the method chooses a configuration for the sensor collection app such that the accuracy of the model is maximized, as follows:

b) $\vec{SC}=(sc_1, \ldots, sc_k)$, such that $\vec{SC}=\text{argmax maxAccuracyLevel}(sc_1, sc_2, \ldots, sc_k)$
subject to the constraint
$\text{XConsumptionRate}(sc_1, sc_2, \ldots, sc_k) \leq \text{maxXConsumptionRate}$, where X can be either battery or storage consumption rate, or given both under max constraints. In other words, alternatively or additionally, the selection of the model can be performed according to the formula given above. Alternatively or additionally, the setting(s) of the sensor(s) of the device can thus be selected based on the formula given above.

The optimization function in both cases preferably refers to finding the set of inputs (sampling configurations or settings for each sensor) given the variables and their constraints. The term sampling configuration(s) can be regarded as a setting or settings of a sensor or sensors. Any optimization algorithm can be used for the purpose of this step, such as mini-batch gradient descent.

Finally, the model trained with the chosen set of sampling configurations $\vec{SC}$ is selected.

This step may involve additional data collection for a sampling configuration not explored but that the algorithm indicates to be more efficient than the current pool of alternatives (e.g., models available and/or generated), as follows in the next variation. In other words, the device includes a model suggestion unit configured for suggesting a configuration of a model and/or an associated sensor setting based on the configurations of the model or models generated. The method includes a corresponding step of suggesting a configuration of a model and/or an associated sensor setting based on the configurations of the model or models generated. Thus, preferably each step of generating a model is informed by information gathered by the preceding step(s) of model generation.

The suggestion unit, in particular an algorithm comprised therein, can be used for determining a new sampling configuration for additional data collection towards optimizing the sampling configuration of the sensors, battery consumption and storage utilization required for achieving a target accuracy for a model.

This preferably means that given the historical data collected so far, the suggestion unit and/or algorithm will suggest a different sampling configuration for which data (e.g., relating to the associated battery consumption and/or data storage space consumption) has not been collected so far, but that could yield better results in terms of target function, e.g., a higher model accuracy within the limits of data storage space consumption and/or battery consumption.

A new model can then be created/trained for the newly collected data in the new sampling configuration. For example, the suggestion unit can suggest that operating the GPS sensor to detect a GPS coordinate every 16 minutes with a coarse level might lead to a model that meets the target function better than available models. In this case, historical data based on this sensor setting my not be available.

The device then operates the sensor with the setting suggested by the suggestion unit. The device trains or creates a model based on the sensory data acquired with this setting (e.g., the series of GPS coordinates) and then assesses how well the resulting model achieves the target function, e.g., by measuring a performance criterion of the model and comparing it to a threshold value and/or tolerance range. In this way, by using the suggestion unit, the models that can be created in the step of model creation are not limited to known models and/or models associated with known sensor settings, e.g., sensor settings for that historical data exist. Thus, the flexibility of model creation is increased, making it more likely to achieve or generate a model that matches the target function, e.g., with a performance criterion that is above the threshold value and/or in the tolerance range.

During the data collection step, the user-facing model, e.g., a model employed by an application running on the device, is halted and no service is provided to the user. For example, the application is made unavailable to the user until a new model has been created and/or selected that matches the target function more closely.

In scenario (a) described above, for example, if the accuracy achieved is significantly better than the target accuracy (e.g., >5% difference, this is a parameter that can be changed based on the use case or set by a user), then the method proceeds to suggest an alternative configuration setting (if a less aggressive configuration, e.g., a configuration requiring less data storage space and/or battery consumption is available), where the sampling parameter values, e.g., the setting(s) of each sensor, are modified such that they are in between this configuration and the one that reached the highest accuracy less than the target accuracy.

In other words, the step of generating a model can include the substep of determining the sensor setting(s) associated with the model to be generated based on an investigation of the sensor setting(s) associated with at least one or more models already generated.

For example, step of determining the sensor settings(s) associated with the model to be generated can involve investigating the sensor setting(s) of a model from among a plurality of models that has a performance criterion that lies below the threshold value and has the smallest deviation from the threshold value amongst the plurality of models and/or can involve investigating the sensor setting(s) of a model of a plurality of models that has a performance criterion that lies above the threshold value and has the smallest deviation from the threshold value amongst the plurality of models.

The sensor settings of the model to be generated can be selected, e.g., by the control unit of the device, as between, in particular in the middle or corresponding to the average of the sensor settings of the "closest loser" of the models and the "closest overachiever" of the models. The closest loser is the model that failed to achieve a performance criterion matching the threshold value with the least amount of deviation of the performance criterion to the threshold value amongst all models having a performance criterion failing to reach the threshold value. The closest overachiever is the model that achieves a performance criterion above the threshold value with the least amount of deviation of the performance criterion to the threshold value amongst all models having a performance criterion above the threshold value. The reasoning for this is that the middle between the least overachieving model and the least underachieving model is likely to be a desirably achieving model. This is repeated until an accuracy is reached that is not significantly different than the target accuracy and falls within a tolerance range surrounding the threshold value.

In a variation, the current amount of available storage at a given time (e.g., the point of time at which a model is selected or generated) is used to determine the maxStorageConsumptionRate such that data can be collected for at least N hours, i.e., maxStorageConsumptionRate=availableStorage/N.

In another variation, the constraint on storageConsumptionRate is removed, e.g., the device immediately uploads any data collected by the sensors, and thus the model and/or application does not consume any data storage space in the device. The data storage space consumption and/or the battery consumption (that can be regarded as an energy consumption) preferably relate to the device that has a battery for storing a limited amount of energy and/or has a memory or data storage device for storing a limited amount of data.

In another variation, the time for creating/training the model is considered as well. The step of creating a model can include or equate to a step of training a model.

The step in which the data collection parameters of the device are configured involves configuring the sampling parameters. Based on the previous step's selected sampling rate per sensor modality (e.g., a sensor setting associated with a selected model), the method further configures the data collection service with the optimal sampling configuration for each different sensor available (e.g., the sensors of the device are operated with the setting(s) associated with the selected model). Additional data is then collected with the set sampling configuration.

The novel system is further illustrated using an example of an application for detecting and/or predicting location that is run on a portable communication device, in this example a smartphone. Location data is inherently difficult to collect from a smartphone. Not only is the collected data potentially privacy invasive, but if configured incorrectly collecting sensory data relating to location will consume unnecessary amounts of data (e.g., mobile data or a monthly plan), data storage and energy at the same time as potentially tracking the user in a way that is more granular (e.g., with a higher resolution) than actually required to achieve a desired accuracy. Thus, the novel system can be used to increase user privacy because a model and/or sensor setting is selected that collects data, e.g., GPS coordinates, only with a frequency that is required for achieving a desired model accuracy.

All smartphones, predominantly those based on the Android and iOS operating system but not limited to those systems, support the collection of location data. In an effort to protect user privacy and/or limit battery drainage, standard operating systems used with conventional smartphones generally offer two main modes of location data collection: coarse location and fine location.

The coarse location mode offers a rough estimation of the location within a radius of about 500 meters in urban areas, while the error margin can be significantly larger in rural areas. An advantage of this setting is that the operating system has full control of when an application is notified about significant movements and when the notification to the application is triggered. There are no explicit guarantees on how often or with what precision this will occur. The implicit benefit is that the power consumption attributed to the individual application is insignificant because not only is the frequency high and precision inaccurate, but the actual battery consumption will also be divided between all applications on the device subscribing to this feature, e.g., all applications running on the device.

The fine location mode, as the name implies, offers all the control that coarse location sampling does not, such as means to define the needed precision ranging from meters up to kilometers. The downside with this approach is naturally an increased power consumption that will be noticeable to the user if the application runs continuously.

Making the selection between the two modes of operation is not necessarily trivial. Take the example of a patient with depression symptoms using a smartphone application to receive a mental health treatment, e.g., to assess whether the patient has managed to leave the house. The application can, with the patient's consent, collect information about physical movement to register whether the patient has left home at some point during the day/week or whether the patient is at risk of complete social isolation. For more severe cases, this might come down to leaving home to go to the convenience store around the corner. This movement by the patient may not be simple to track or detect using coarse location because even in an urban setting, the precision could be too inaccurate to track a displacement of just a few hundred meters. A physician remotely monitoring the movement of the patient would have to rely on data with insufficient accuracy to verify the claims of the patient, e.g., the data is not accurate enough to assess whether the patient's claim to have gone to the convenience store actually occurred.

In such a case, the device while starting off at the minimum precision level, which for location means using coarse sampling for this person or user, would infer that while the battery consumption was optimal, the accuracy was not. The device updates the configuration to move from a setting of coarse location sampling to the minimum viable sensor configuration for fine location. Moreover, in some operating systems with user permission, it is possible to measure battery consumption per application. In other operating systems or in the case that the actual battery consumption for the data collection application cannot be accurately measured, it can still be estimated/reported as relative to the total battery consumption.

How the device is configured for fine location sampling differs between the major platforms, but in general there are settings allowing for a gradual refinement in localization. For this example the system will start off by updating the location configuration to use an accuracy in the range of hundreds of meters, which in urban environments provides slightly better accuracy with coarse location sampling and more frequent updates than would GPS localization with infrequent updates. Moreover, coarse location sampling using cell tower triangulation has magnitudes less impact on battery power consumption than does GPS localization.

In an urban setting, cell tower triangulation might be enough to achieve the desired accuracy in detecting and/or predicting the location of a user, but further adjustments can be made if the target accuracy of the model is not reached. Generally all platforms support distance filtering and more narrow accuracy. These parameters can be adjusted in multiple ways. If for instance an accuracy level of 10 meters is applied, that will have a significant impact on battery consumption due to the need to activate GPS localization to achieve the desired accuracy level. If this accuracy is required, there are few other options available, but the impact can be offset to some degree by adjusting distance filters and similar options that are available across all smartphone platforms.

In short, there are multiple ways for the system to gradually tune or modify the location configuration for the data collecting application towards optimal values for each individual person and/or user.

This example is described in more detail below.

For a simplified example about optimizing the sensor settings for location data collection, we may assume that the following configuration options are available for iterations 1 though 4, in which different sensor settings are investigated and in the mode accuracy for each sensor setting is assessed. The example below illustrates how the device, such as a smartphone, behaves when using four different parameters for the configuration defined in each iteration.

The sensor settings in this example that are associated with four iteratively generated models are shown in Table 1 below. The listed configurations and parameter values for the sensor settings apply to iterations 1 through 4.

|  | Iteration 1 | Iteration 2 | Iteration 3 | Iteration 4 |
| --- | --- | --- | --- | --- |
| mode | coarse | fine | fine | fine |
| accuracy | — | 100 meters | 10 meters | best |
| filter | — | 50 meters | 10 meters | 1 meter |
| type | — | other | fitness | fitness |

In Table 1, "mode" relates to a coarse or fine mode of detecting location, as described above. The item "accuracy" relates to the set accuracy of the collection of sensory data by a sensor, e.g., a required accuracy in meters for the sensor to detect a location. The item "filter" denotes the varying granularity (e.g., a filter with a resolution of 10 meters or 50 meters) that is used. The filter can be a method of throttling the number of events generated by the operating system in order to preserve battery power. The item "type" relates to an additional configuration for how location tracking is configured on the platform layer, preferably to optimize battery consumption.

In the example of Table 1, the type "fitness" indicates a setting of movement tracking. In this example, the location data collection is configured for fitness tracking, which corresponds to the most detailed type of tracking because it follows the user's physical movements with very high accuracy (meaning battery consumption will be higher than if any of the other mode is used).

Figure 2:
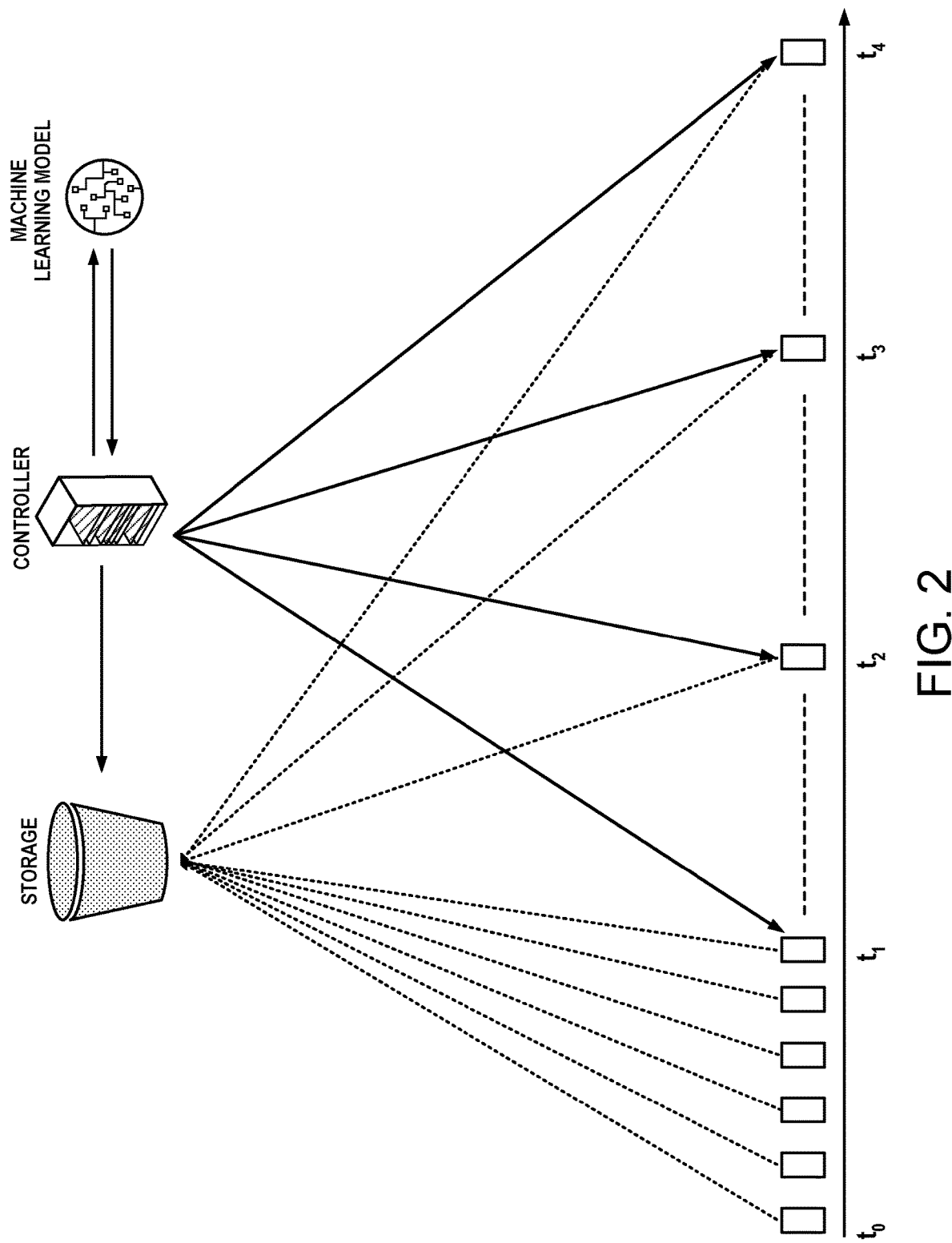
FIG. 2 illustrates the iterative process of generating multiple models pertaining to different sensor settings, preferably including which sensor modality is used (e.g., video data, GPS-based location data) and how each sensor is operated (e.g., sampling rate).

FIG. 2 illustrates the iterative approach of the novel method used by the novel system and how the different components interact with each other. The iterations occur at time points $t_0$, $t_1$, $t_2$, $t_3$ and $t_4$. Each iteration begins with the data collecting device, e.g., a smartphone, being provided with a configuration on how each sensor should behave, e.g., a sensor setting. This example focuses on the distinct case of location for the sake of simplicity, but the system is in no way limited to this scenario and any other type of sensor or sensor modality may be used.

In a first step at to, the system starts off either with a preconfigured sensor configuration (e.g., a sensor setting) or by downloading one from a central controller and/or a data storage device. This configuration is likely chosen to be the most accurate and demanding one possible. In other words, the system most likely starts with a sensor setting that achieves a maximum mode accuracy and thus is likely to result in a rather high battery consumption and/or data storage space consumption. The system proceeds to collect location information, e.g., by acquiring sensory data via a location sensor, using this configuration between $t_x$ and $t_{x+1}$. The collected information is periodically sent to the central controller and/or a data storage device together with information about battery power consumption and/or data storage space consumption resulting from the operation of the system and/or sensor setting.

In a next step, model accuracy is evaluated. At the end of each iteration, the controller of the system will fetch the data collected during the prior period (e.g., at $t_4$ the controller will fetch data collected during the time interval between $t_3$ and $t_4$), perform necessary preprocessing and data cleaning and then enter the data into a preferably predefined machine learning model.

The machine learning model outputs an accuracy score, which is recorded by the controller together with summarized scores for battery and storage consumption, and this information is stored by the controller so it can be consulted once the evaluation period is over.

Table 2 below indicates exemplary accuracy scores and associated summarized scores for battery and storage consumption corresponding to iterations 1 through 4. Model accuracy levels are summarized given different iterations and configurations for a week of collection.

|  | Iteration 1 | Iteration 2 | Iteration 3 | Iteration 4 |
| --- | --- | --- | --- | --- |
| Model accuracy level | 0.4 | 0.5 | 0.87 | 0.95 |
| Total battery consumption level (over a week) | 0.005 | 0.007 | 0.01 | 0.05 |
| Total storage consumption level | 1 MB | 5 MB | 15 MB | 100 MB |

The next step pertains to selecting the model and sensor setting, e.g., sampling rate of a given sensor. After summarizing and storing all outputs from an iteration (or measured characteristics of a model corresponding to an interaction), the controller of the system proceeds to decide if another iteration is needed or not, and if affirmative, prepares the device for the next phase. When preparations are completed, the device of the system is notified about the new configuration (e.g., a sensor setting), downloads it and begins the next iteration from $t_{x+1}$ to $t_{x+2}$.

When the evaluation terminates, the controller has access to a summary of the accuracy of the model for each iteration, as well as the consumption of battery and storage, as illustrated by Table 2.

In Table 2, battery consumption refers to battery consumption level (e.g., iteration 1 at 20%) of the device based on the sampling rate used for iteration 1. This level can be absolute on platforms that allow it (e.g., Android), or relative on platforms that show the relative battery consumption of the data collection service in a period of time (e.g., iOS).

Generally, the battery (or energy) consumption may be expressed as a rate or as an amount over a selected period of time (e.g., an hour, a day or a week). The same applies to the data storage space consumption.

Based on the information in Table 2, the optimization algorithm can make the final decision (which can be a selection of a model) on which configuration meets the desired accuracy threshold with minimal impact on battery level and storage level (and data transfer).

The method involves a step of determining whether, with the given configurations and accuracy levels (e.g., iterations 1 to 4), there is at least one configuration (or model) that meets the target function. The optimal sensor setting and/or model that meets the target function is then selected.

In this example, the target accuracy level given by the method is 0.8. For this target accuracy level, the method or system selects the model of Iteration 3 as having the optimal configuration, where the minimum battery consumption (i.e., 0.01) is achieved and the model accuracy is higher than or equal to the target accuracy, as illustrated in FIG. 3.

Figure 3:
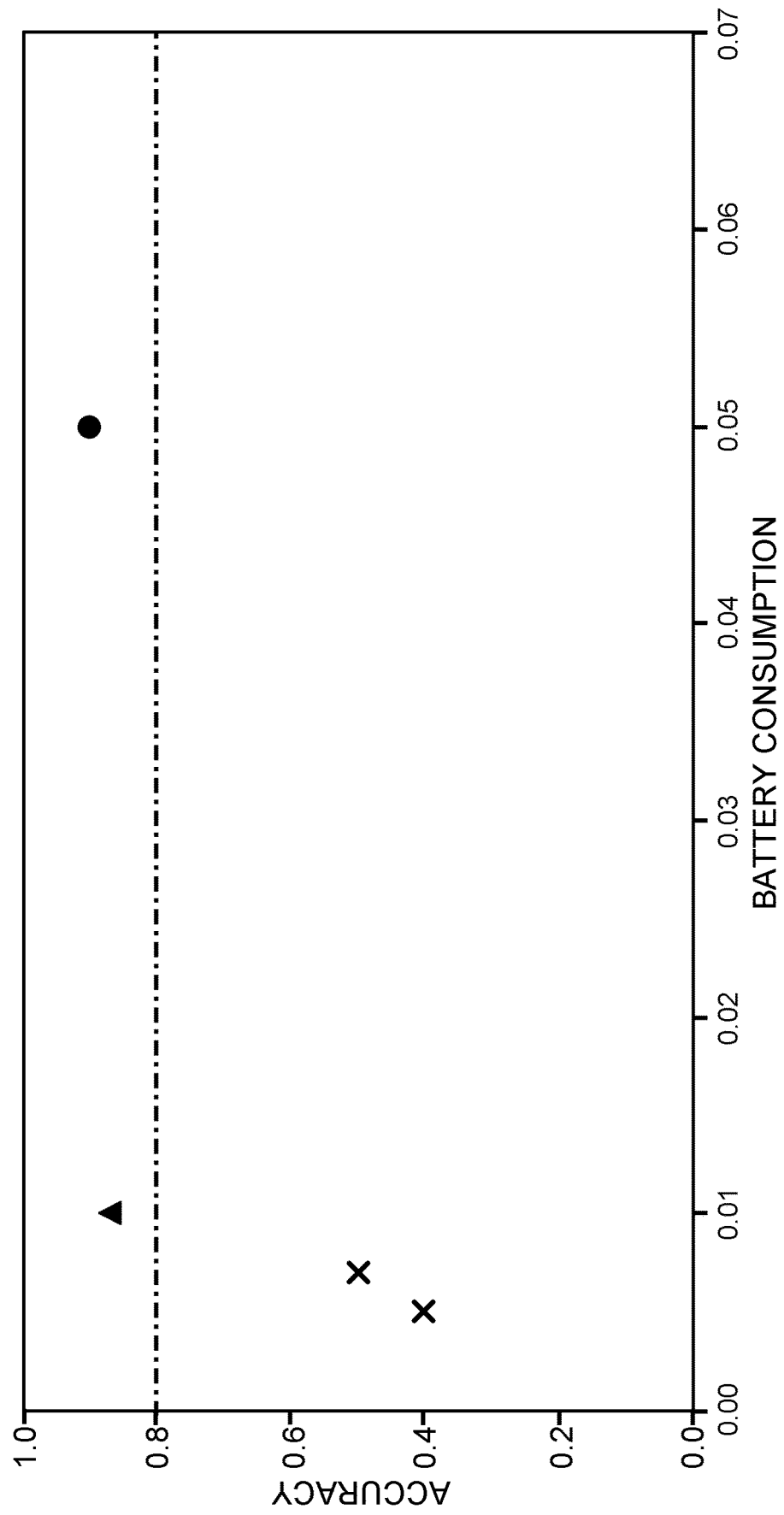
FIG. 3 illustrates the step of measuring performance criteria of multiple models and comparing those performance criteria to a threshold value.

FIG. 3 is a scatter plot of model accuracy plotted against battery consumption level for the models corresponding to the first four iterations in Table 2. The dashed line indicates the threshold value of 0.8 accuracy. Points correspond to the iterations that meet the accuracy threshold and crosses to those that do not. The chosen iteration (number 3) is marked with a triangle. Given that the accuracy achieved by the model of iteration 3 is close to 10% higher than the target accuracy (significant difference as it is higher than X threshold, where X could be 5%), the method suggests another iteration where the sampling configuration is modified to reach an accuracy closer to the target accuracy, while further minimizing the battery consumption.

For instance, the model of the next Iteration 5 could be generated based on the following setting(s) (where the sensor setting of Iteration 5 is somewhere between the settings of Iteration 2 and 3):

|  | Iteration 5 |
| --- | --- |
| mode | fine |
| accuracy | 100 m |
| filter | 25 m |
| type | fitness |

With this new configuration, data is collected over a week, and a new model is created.

The accuracy of the model in this example has been detected to be 0.82, while the battery consumption is 0.008. Because the accuracy is just slightly, but not significantly, above the target accuracy level of 0.8, and the battery consumption was further reduced, the method or system selects the model of iteration 5, as illustrated by the triangle in the plot of FIG. 4.

Figure 4:
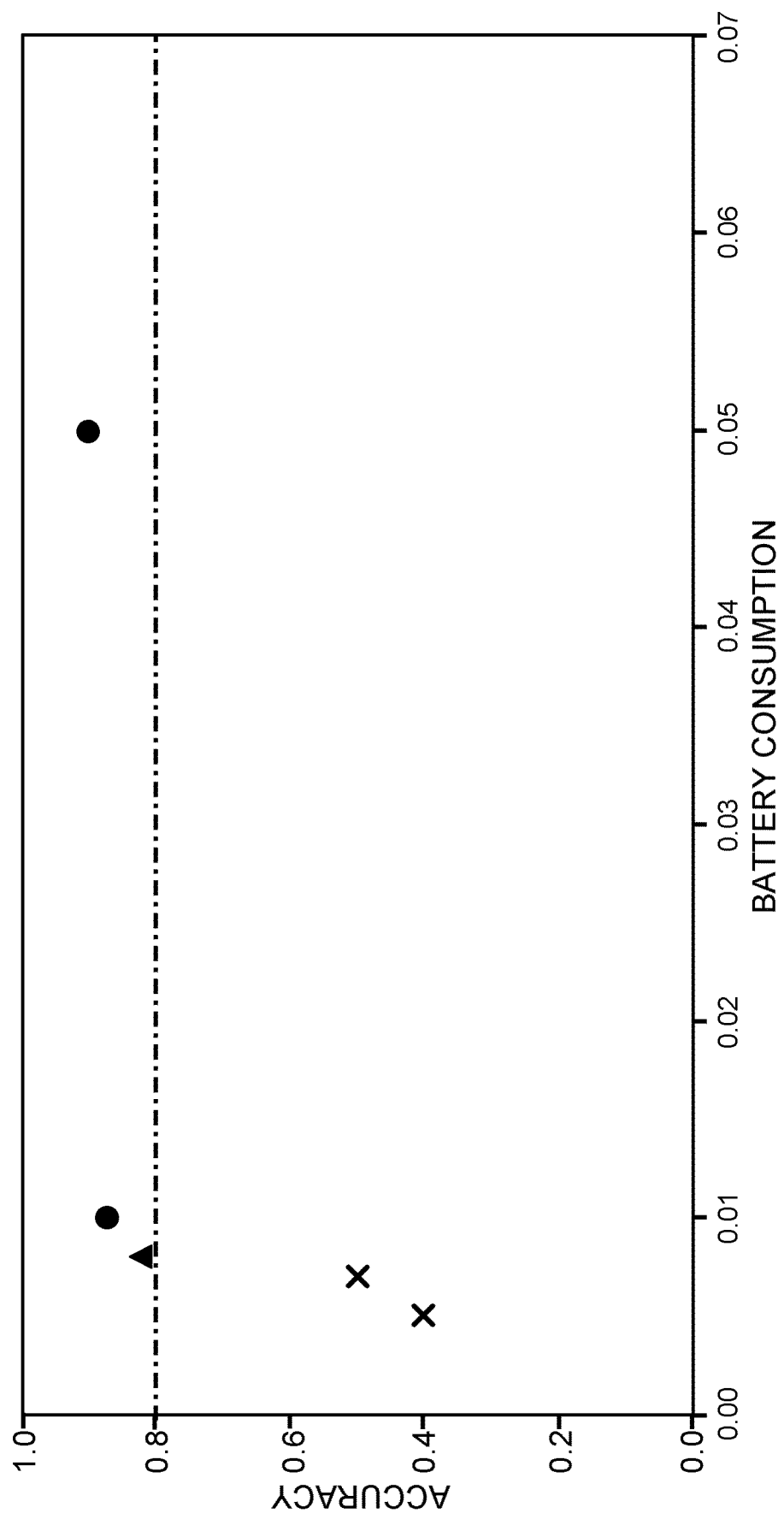
FIG. 4 illustrates the case in which the performance criterion of a model exceeds the threshold value and tolerance range, and the model is thus subsequently adapted to bring the performance criterion of the model closer to the threshold value and/or tolerance range.

FIG. 4 is a scatter plot of model accuracy plotted against battery consumption for the models of all five iterations. Solid points correspond to iterations that meet the accuracy threshold and crosses to those that do not. The selected model, with is the chosen iteration (number 5), is marked with a triangle.

In another embodiment, the method or system evaluates whether with the given configurations and battery consumption levels, there is at least one configuration that meets the maximum battery consumption threshold. In other words, the step of selecting the model can include at least two subsequent steps of assessing each model of a plurality of models with regard to a characteristic of the model (e.g., an associated energy consumption, battery storage space consumption and/or data consumption and/or model accuracy), wherein in each step each model is assessed with regard to a different parameter. For example, in the first step, the models can be assessed with regard to model accuracy, and in the second step all models can be assessed with regard to battery consumption.

The iterations presented in Table 2 are used to illustrate this variation. In this example, the target battery consumption level given by the method is 0.02, and the maximum storage consumption level is 10 MB. Thus, for this target, the method or system selects the model of Iteration 2 as having the optimal configuration, where the maximum accuracy (i.e., 0.5) is achieved that meets the battery consumption and storage consumption thresholds, as illustrated in FIG. 5.

Figure 5:
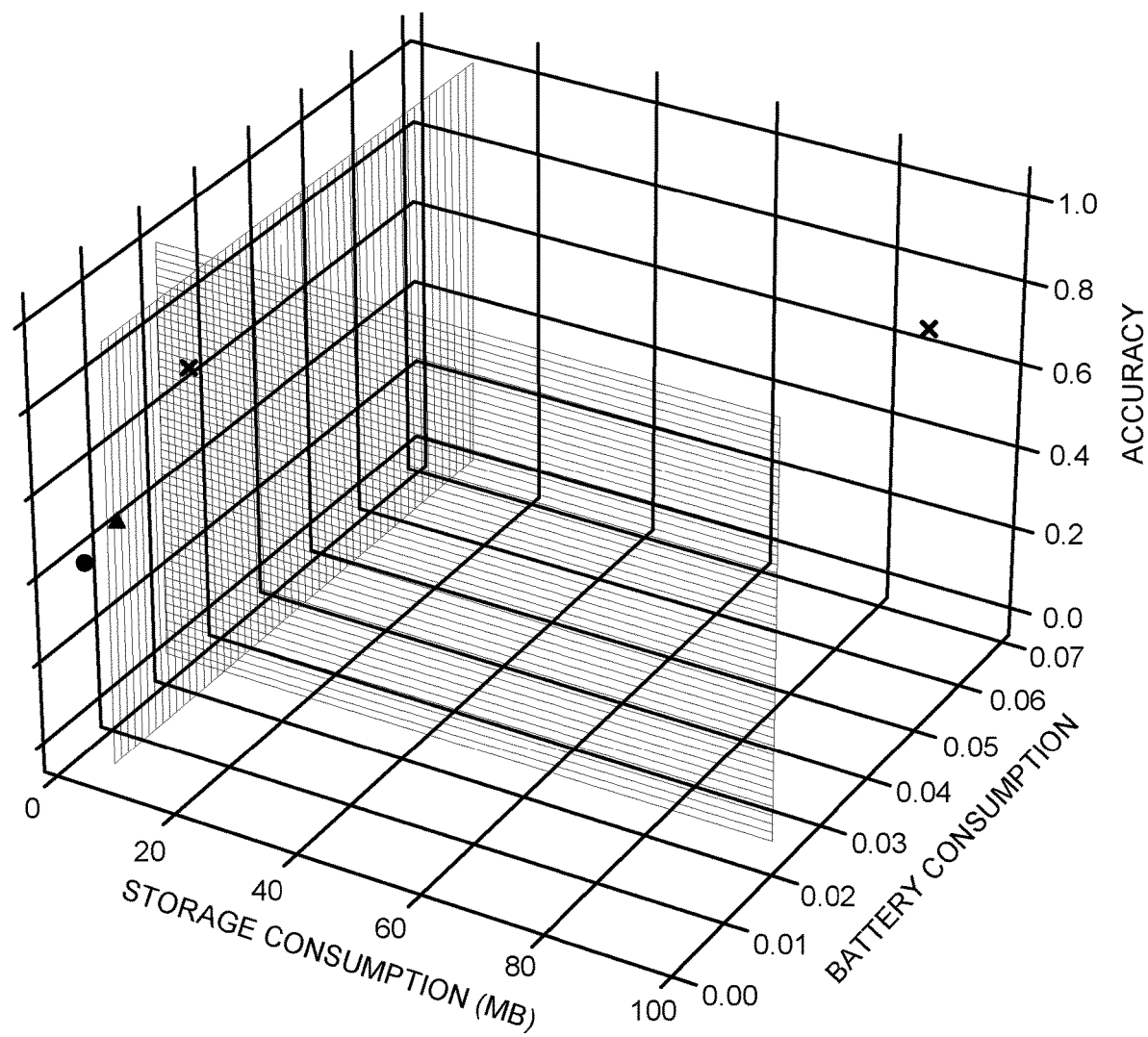
FIG. 5 shows a 3D-scatter plot illustrating the selection of a model based on two requirements or constraints, such as a defined maximum data storage consumption and a defined maximum battery consumption.

FIG. 5 is a 3D scatter plot of model accuracy plotted against both battery consumption and storage consumption for the first 4 iterations. Solid points correspond to iterations that meet the battery and storage consumption thresholds and crosses to those that do not. The chosen iteration (number 2) is marked with the triangle. Note that while iteration 3 satisfies the maximum battery consumption threshold, it does not satisfy the maximum storage consumption threshold (15 MB>10 MB).

The Controller then sets the optimal configuration setting in the data collection app. In other words, the device is configured to operate the sensors with a setting associated with the selected model, e.g., in the case of FIG. 4 with the settings associated with the model of iteration 5. A device in the sense of this disclosure can be a smartphone, tablet, computer, control panel or any other suitable electronic device. The device can be mobile and/or portable.

The present disclosure relates to a computer-implemented method and system for determining sensor settings of a device to optimize the trade-off between model accuracy, battery consumption and data storage amounts. The method involves iteratively assessing different sensor settings for the achieved model accuracy using those settings taking into account the associated cost in terms of battery consumption and data storage space. Once a model has been identified as providing the desirable trade-off, the device is configures to operate sensors with the setting(s) associated with the identified model.

Optimizing the battery usage of data collection via sensors on mobile phones is a widely studied problem, especially for battery intensive sensors such as location sensors. The objective is to balance the trade-off between the frequency of data collection and the battery usage because battery draining apps can lead many users to uninstall them.

While methods exist that focus on this tradeoff for particular sensors, the novel method is an integrated method that balances the accuracy of a model (e.g., a machine learning model for recommending to a user entertainment activities, advertisements, or predicting health outcomes) with the battery power and storage space consumed by multiple sensor modalities at the same time with different data collection sampling configurations or settings of the sensors. The method can achieve an optimal configuration setting of a data collection service (e.g., an application or model acquiring data via sensors) that balances between the following constraint variables: battery usage, storage usage, model accuracy, sensor setting, such as sampling configuration (e.g., frequency).

In this disclosure, if certain elements or features of the invention are disclosed in a certain combination or in the context of a certain embodiment or aspect, those elements or features may also be present in the novel method or system in isolation or in different combinations or in the context of a different embodiment. For example, features disclosed in the context of a device can also apply to a method and vice versa.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for optimizing consumed battery power of a mobile device running configurable software, used data storage space on the mobile device, and accuracy of an algorithmic model used by the configurable software, comprising:
   collecting data relating to a first setting of a sensor of the mobile device;
   collecting data relating to a first modality of the sensor;
   retrieving historical data relating to an amount of battery power consumed while in the first setting of the sensor;
   retrieving historical data relating to an amount of data storage space used while in the first setting of the sensor;
   generating a first model that is trained based on the collected data relating to the first setting, the collected data relating to the first modality, the retrieved historical data relating to the consumed amount of battery power and the retrieved historical data relating to the used amount of data storage space, wherein the first model is based on the first setting of the sensor;
   measuring an accuracy achieved by the first model at a maximum consumed battery power and a maximum used data storage space;
   adopting the first model if the accuracy of the first model both is equal to or greater than a first accuracy threshold value and is equal to or less than a second accuracy threshold; and
   configuring the mobile device to run the configurable software using the first model and to operate the sensor using the first setting.

2. The method of claim 1, comprising:
   generating a second model if the accuracy of the first model is not both equal to or greater than the first accuracy threshold value and equal to or less than the second accuracy threshold, wherein the second model is based on a second setting of the sensor, and wherein the second setting differs from the first setting with regard to a parameter governing how the sensor operates;
   measuring the accuracy achieved by the second model;
   adopting the second model if the accuracy of the second model both is equal to or greater than the first accuracy threshold value and is equal to or less than the second accuracy threshold; and
   configuring the mobile device to run the configurable software using the second model and to operate the sensor using the second setting.

3. The method of claim 2, comprising:
   generating a third model if the accuracy of neither the first model nor the second model is not both equal to or greater than the first accuracy threshold value and equal to or less than the second accuracy threshold, wherein the third model is based on a third setting of the sensor, and wherein the third setting differs from the second setting and the first setting with regard to the parameter governing how the sensor operates;
   measuring the accuracy achieved by the third model;
   adopting the third model if the accuracy of the third model both is equal to or greater than the first accuracy threshold value and is equal to or less than the second accuracy threshold; and
   configuring the mobile device to run the configurable software using the third model and to operate the sensor using the third setting.

4. The method of claim 1, wherein a plurality of models based on different settings of the sensor are iteratively generated, and wherein the accuracy achieved by each of the plurality of models is compared to the first accuracy threshold value and the second accuracy threshold value until one of the plurality of models is identified that achieves an accuracy that is both equal to or greater than the first accuracy threshold value and equal to or less than the second accuracy threshold.

5. The method of claim 1, wherein the sensor has the first setting and a second setting, and wherein the first model is based on both the first setting and the second setting.

6. The method of claim 1, wherein the first modality is selected from the group consisting of: sensing accelerometer data, sensing audio data, sensing video data, and sensing GPS-based location data.

7. The method of claim 6, wherein the mobile device has the sensor and a second sensor, wherein the sensor operates in the first modality, and wherein the second sensor operates in a second modality.

8. The method of claim 7, wherein the first model is adopted based on the amount of battery power consumed while operating the sensor using the first setting, the amount of data storage space used while operating the sensor using the first setting, and based on the first modality.

9. The method of claim 7, wherein the sensor operates in the first modality using the first setting, wherein the second sensor operates in the second modality using a second setting, and wherein the mobile device is configured to change from operating the sensor in the first modality to operating the second sensor in the second modality based on the first setting and the second setting.

10. The method of claim 7, wherein the mobile device is configured to switch from operating the sensor in the first modality to operating the second sensor in the second modality.

11. The method of claim 1, wherein the mobile device is configured to change from operating the sensor using the first setting while running the configurable software using the first model to operating the sensor using a second setting while running the configurable software using a second model.

12. A method for optimizing consumed battery power of a mobile device running configurable software, used data storage space on the mobile device, and accuracy of an algorithmic model used by the configurable software, comprising:

collecting data relating to a first setting of a sensor of the mobile device;
collecting data relating to a first modality of the sensor;
retrieving historical data relating to an amount of battery power consumed while in the first setting of the sensor;
retrieving historical data relating to an amount of data storage space used while in the first setting of the sensor;
generating a first model that is trained based on the collected data relating to the first setting, the collected data relating to the first modality, the retrieved historical data relating to the consumed amount of battery power and the retrieved historical data relating to the used amount of data storage space, wherein the first model is based on the first setting of the sensor;
measuring an accuracy achieved by the first model at a maximum consumed battery power and a maximum used data storage space, and comparing the accuracy achieved by the first model to an accuracy threshold value;
adopting the first model if the accuracy of the first model equals or exceeds the accuracy threshold value; and
configuring the mobile device to run the configurable software using the first model and to operate the sensor using the first setting.

13. The method of claim 12, comprising:

generating a second model if the accuracy of the first model does not equal or exceed the accuracy threshold value, wherein the second model is based on a second setting of the sensor, and wherein the second setting differs from the first setting with regard to a parameter governing how the sensor operates;
measuring the accuracy achieved by the second model and comparing the accuracy achieved by the second model to the accuracy threshold value;
adopting the second model if the accuracy of the second model equals or exceeds the accuracy threshold value; and
configuring the mobile device to run the configurable software using the second model and to operate the sensor using the second setting.

14. The method of claim 12, wherein a plurality of models based on different settings of the sensor are iteratively generated, and wherein the accuracy achieved by each of the plurality of models is compared to the accuracy threshold value until one of the plurality of models is identified that achieves an accuracy that equals or exceeds the accuracy threshold value.

15. The method of claim 12, wherein the first modality is selected from the group consisting of: sensing accelerometer data, sensing audio data, sensing video data, and sensing GPS-based location data.

16. The method of claim 15, wherein the mobile device has the sensor and a second sensor, wherein the sensor operates in the first modality, and wherein the second sensor operates in a second modality.

17. The method of claim 16, wherein the mobile device is configured to switch from operating the sensor in the first modality to operating the second sensor in the second modality.

18. A device that optimizes consumed battery power, used data storage space, and accuracy of an algorithmic model, comprising:

a sensor;
a battery; and
a control unit configured to collect data relating to a first setting of the sensor and a first modality of the sensor, to retrieve historical data relating to an amount of power of the battery consumed while in the first setting of the sensor, and to retrieve historical data relating to an amount of data storage space used while in the first setting of the sensor, wherein the device is configured to generate a first model that is trained based on the collected data relating to the first setting, the collected data relating to the first modality, the retrieved historical data relating to the consumed amount of battery power and the retrieved historical data relating to the used amount of data storage space, wherein the first model is based on the first setting of the sensor, wherein the device is configured to measure an accuracy achieved by the first model at a maximum consumed power of the battery and a maximum used data storage space and to compare the accuracy achieved by the first model to an accuracy threshold value, and wherein if the accuracy of the first model equals or exceeds the accuracy threshold value the device is configured to operate using the first model and the sensor based on the first setting.

19. The device of claim 18, wherein the device is configured to operate using the first model and the sensor based on the first setting only if the accuracy of the first model both equals or exceeds the accuracy threshold value and is equal to or less than a second accuracy threshold.

20. The device of claim 18, wherein the device is configured to:

generate a second model if the accuracy of the first model does not equal or exceed the accuracy threshold value, wherein the second model is based on a second setting of the sensor, and wherein the second setting differs from the first setting with regard to a parameter governing how the sensor operates;
measure the accuracy achieved by the second model and compare the accuracy achieved by the second model to the accuracy threshold value; and
operate using the second model and the sensor based on the second setting if the accuracy of the second model equals or exceeds the accuracy threshold value.

21. The device of claim 20, wherein the device is configured to:

generate a third model if the accuracy of the first model and second model does not equal or exceed the accuracy threshold value, wherein the third model is based on a third setting of the sensor, and wherein the third setting differs from the second setting and the first setting with regard to the parameter governing how the sensor operates;
measure the accuracy achieved by the third model and compare the accuracy achieved by the third model to the accuracy threshold value; and
operate using the third model and the sensor based on the third setting if the accuracy of the third model equals or exceeds the accuracy threshold value.

22. The device of claim 18, wherein the device is configured to:

iteratively generate a plurality of models based on different settings of the sensor, wherein the accuracy achieved by each of the plurality of models is compared to the accuracy threshold value until one of the plurality of models is identified that achieves an accuracy that equals or exceeds the accuracy threshold value.

23. The device of claim 18, wherein the sensor has the first setting and a second setting, and wherein the first model is based on both the first setting and the second setting.

* * * * *